United States Patent
Guan et al.

(10) Patent No.: US 10,638,276 B2
(45) Date of Patent: Apr. 28, 2020

(54) METHOD FOR SETTING UP RADIO BEARER AND NETWORK DEVICE

(71) Applicant: HUAWEI TECHNOLOGIES CO., LTD., Shenzhen (CN)

(72) Inventors: Shiguo Guan, Shanghai (CN); Ming Li, Shanghai (CN); Dingzhang Dai, Shanghai (CN); Jian Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/921,657

(22) Filed: Mar. 15, 2018

(65) Prior Publication Data

US 2018/0206087 A1    Jul. 19, 2018

Related U.S. Application Data

(63) Continuation of application No. PCT/CN2015/089579, filed on Sep. 15, 2015.

(51) Int. Cl.
*H04L 12/66* (2006.01)
*H04W 4/18* (2009.01)
(Continued)

(52) U.S. Cl.
CPC .............. *H04W 4/18* (2013.01); *G10L 19/24* (2013.01); *H04L 65/605* (2013.01); *H04W 76/10* (2018.02)

(58) Field of Classification Search
CPC . H04L 12/64; H04L 29/06176; H04L 65/102; H04L 2012/64; H04W 4/18;
(Continued)

(56) References Cited

U.S. PATENT DOCUMENTS 7,619,995 B1    11/2009   El-Hennawey et al.
7,933,258 B2 *  4/2011   Farber ................. H04W 88/181
                                                      370/352
(Continued)

FOREIGN PATENT DOCUMENTS

CN        1552164 A      12/2004
CN        101031001 A    9/2007
(Continued)

OTHER PUBLICATIONS

Ojala et al, The Adaptive Multirate Wideband Speech Codec: System Characteristics, Quality Advances, and Deployment Strategies, IEEE, 7 pages, 2006.*
(Continued)

*Primary Examiner* — Frank Duong
(74) *Attorney, Agent, or Firm* — Kilpatrick Townsend & Stockton LLP

(57) ABSTRACT

Embodiments of the present invention disclose a method including: determining whether, in an end-to-end link in which a voice service is performed between a first terminal and a second terminal, at least one logical functional entity that is capable of providing only a voice service of a low voice quality codec scheme exists between a network device and the second terminal, where all logical functional entities, in the link, between the network device and the first terminal are capable of providing a voice service of a high voice quality codec scheme; and if at least one logical functional entity that is capable of providing only the voice service of the low voice quality codec scheme exists, in the link, between the network device and the second terminal, setting up, for the first terminal, a radio bearer used to perform the voice service of the high voice quality codec scheme.

16 Claims, 12 Drawing Sheets

---

A network device determines whether, in an end-to-end link in which a voice service is performed between a first terminal and a second terminal, at least one logical functional entity that is capable of providing only a low voice quality codec scheme exists between the network device and the second terminal — S201

The network device sets up, for the first terminal, a radio bearer used to perform a voice service of a high voice quality codec scheme — S202

(51) Int. Cl.
*G10L 19/24* (2013.01)
*H04L 29/06* (2006.01)
*H04W 76/10* (2018.01)

(58) Field of Classification Search
CPC ............. H04W 28/02; H04W 28/0252; H04W 28/0257; H04W 76/10; H04W 76/16
See application file for complete search history.

(56) References Cited

U.S. PATENT DOCUMENTS

| | | | | |
|---|---|---|---|---|
| 9,401,975 | B2* | 7/2016 | Hori | ...................... H04W 76/10 |
| 2004/0254786 | A1* | 12/2004 | Kirla | ..................... G10L 21/038 |
| | | | | 704/216 |
| 2010/0228557 | A1 | 9/2010 | Chen et al. | |
| 2013/0030798 | A1 | 1/2013 | Mittal et al. | |
| 2013/0223304 | A1* | 8/2013 | Tanaka | ................ H04L 65/1016 |
| | | | | 370/310 |
| 2014/0106729 | A1* | 4/2014 | Zou | ......................... G10L 19/24 |
| | | | | 455/418 |

FOREIGN PATENT DOCUMENTS

| | | |
|---|---|---|
| CN | 101667888 A | 3/2010 |
| CN | 103337243 A | 10/2013 |
| CN | 103703512 A | 4/2014 |
| CN | 103871415 A | 6/2014 |
| WO | 03003770 A1 | 1/2003 |
| WO | 2009056027 A1 | 5/2009 |

OTHER PUBLICATIONS

3GPP TSG-SA4#18 meeting TD S4-010512(3GPP TSG-SA WG2 Meeting #19 Tdoc S2-012280),"AMR-WB speech service and bearer optimisation",Vodafone,Sep. 3-7, 2001,total 4 pages.

* cited by examiner

METHOD FOR SETTING UP RADIO BEARER AND NETWORK DEVICE

CROSS-REFERENCE TO RELATED APPLICATIONS

This application is a continuation of International Application No. PCT/CN2015/089579, filed on Sep. 15, 2015, the disclosure of which is hereby incorporated by reference in its entirety.

TECHNICAL FIELD

The present invention relates to the communications field, and in particular, to a method for setting up a radio bearer, and a network device.

BACKGROUND

Adaptive Multi-Rate (Adaptive Multi-Rate, AMR for short) is a speech codec scheme used in communication and is specifically divided into adaptive multi-rate narrowband codec (Adaptive Multi-Rate Narrowband, AMR-NB for short) and adaptive multi-rate wideband codec (Adaptive Multi-Rate Wideband, AMR-WB for short).

As for AMR-NB, a voice signal with a frequency bandwidth ranging from 300 Hz to 3400 Hz is generated by using an 8 KHz voice sampling frequency; and for AMR-WB, a voice signal with a frequency bandwidth ranging from 50 Hz to 7 kHz is generated by using a 16 kHz sampling frequency. For a low-frequency part from 50 Hz to 300 Hz, voice naturalness and a sense of presence are improved; for a high-frequency part from 3.4 kHz to 7 kHz, intelligibility of sounds and clearness of fricatives are increased. Therefore, compared with AMR-NB, AMR-WB can provide high-definition voices for a user.

To provide better experience in a voice service, an increasing quantity of terminals support the AMR-WB technology, and mobile telecommunications operators are gradually deploying high-definition voices that are based on the AMR-WB technology. Therefore, there exists, on an existing network, a phenomenon that not all devices are capable of providing an AMR-WB voice service.

In a process of implementing a voice service, it is required that all logical functional entities (for example, a core network, an access network, and a terminal) in an end-to-end link are capable of providing the AMR-WB voice service, so that an AMR-WB radio bearer can be set up to provide a high quality voice service. Therefore, quality of the voice service depends on a device that has a lowest voice service codec capability in a system. Between two parties (calling/called terminals) in communication, when a terminal at only one end provides the AMR-WB voice service while other devices provide only an AMR-NB voice service, a service capability is restricted, only a radio bearer for the AMR-NB voice service can be set up between the terminals, and both the two parties in communication use AMR-NB to implement a low quality voice service. Therefore, a user of the terminal that has an AMR-WB capability cannot experience a high-definition voice. As a result, user experience of the terminal is inconsistent with the capability of the terminal, and user experience is poor.

SUMMARY

The present invention provides a method for setting up a radio bearer and a network device, implementing that a user of a terminal that is capable of providing a high-quality codec capability can experience a high-definition voice service, so that user experience of the terminal is consistent with the capability of the terminal, thereby improving user experience thereof.

To achieve the foregoing objectives, embodiments of the present invention adopt the following technical solutions:

According to a first aspect, a method for setting up a radio bearer is provided, applied to a network device, where the network device is capable of providing a voice service of a high voice quality codec scheme, and the method includes:

determining whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing the voice service of the high voice quality codec scheme; and if at least one logical functional entity that is capable of providing only the voice service of the low voice quality codec scheme exists, in the link, between the network device and the second terminal, setting up, for the first terminal, a radio bearer used to perform the voice service of the high voice quality codec scheme.

With reference to the first aspect, in a first possible implementation manner of the first aspect, after the setting up, for the first terminal, a radio bearer used to perform the voice service of the high voice quality codec scheme, the method further includes:

receiving voice data of the high voice quality codec scheme, and performing down-sampling conversion to convert the voice data of the high voice quality codec scheme into voice data of the low voice quality codec scheme before sending;

or, receiving voice data of the low voice quality codec scheme, and performing spread spectrum conversion to convert the voice data of the low voice quality codec scheme into voice data of the high voice quality codec scheme before sending.

With reference to the first aspect or the first possible implementation manner of the first aspect, in a second possible implementation manner of the first aspect, the setting up, for the first terminal, a radio bearer used to perform the voice service of the high voice quality codec scheme includes:

if no radio bearer has been set up for the first terminal, setting up, for the first terminal, a new radio bearer used to perform the voice service of the high voice quality codec scheme; or if a radio bearer used to perform the voice service of the high voice quality codec scheme has been set up for the first terminal, keeping the radio bearer of the first terminal unchanged.

With reference to the first aspect, the first possible implementation manner of the first aspect, or the second possible implementation manner of the first aspect, in a third possible implementation manner of the first aspect, the network device is a radio access network device;

the determining whether, in an end-to-end link in which a voice service is performed between a first terminal and a second terminal, at least one logical functional entity that is capable of providing only a voice service of a low voice quality codec scheme exists between the network device and the second terminal includes:

receiving an assignment message that is sent by a core network device and that is used to set up a voice service radio bearer, where if the assignment message instructs to set up a radio bearer of the low voice quality codec scheme, at least one logical functional entity that is capable of providing only the voice service of the low voice quality codec scheme exists, in the link, between the network device and the second terminal; and the setting up, for the first terminal, a radio bearer used to perform the voice service of the high voice quality codec scheme includes:

setting up, for the first terminal, the radio bearer used to perform the voice service of the high voice quality codec scheme, and sending an instruction message to the first terminal, where the instruction message is used to instruct the first terminal to configure a protocol layer for high voice quality.

With reference to the first aspect, the first possible implementation manner of the first aspect, or the second possible implementation manner of the first aspect, in a fourth possible implementation manner of the first aspect, the network device is the first terminal;

the determining whether, in an end-to-end link in which a voice service is performed between a first terminal and a second terminal, at least one logical functional entity that is capable of providing only a voice service of a low voice quality codec scheme exists between the network device and the second terminal includes:

receiving an instruction message sent by a radio access network device for configuring a protocol layer, where if the instruction message instructs to configure a protocol layer for low voice quality, at least one logical functional entity that is capable of providing only the voice service of the low voice quality codec scheme exists, in the link, between the network device and the second terminal; and the setting up, for the first terminal, a radio bearer used to perform the voice service of the high voice quality codec scheme includes:

configuring a protocol layer for high voice quality.

With reference to the first aspect, the first possible implementation manner of the first aspect, or the second possible implementation manner of the first aspect, in a fifth possible implementation manner of the first aspect, the network device is a core network device, and the setting up, for the first terminal, a radio bearer used to perform the voice service of the high voice quality codec scheme includes:

sending, to a radio access network device that provides a service to the first terminal, an assignment message used to set up the radio bearer of the voice service of the high voice quality codec scheme.

With reference to the fifth possible implementation manner of the first aspect, in a sixth possible implementation manner of the first aspect, after the setting up, for the first terminal, a radio bearer used to perform the voice service of the high voice quality codec scheme, the method further includes:

sending, to a radio access network device that provides a service to the second terminal, an assignment message used to set up a radio bearer of the voice service of the low voice quality codec scheme.

With reference to the first aspect or any one of the first possible implementation manner of the first aspect to the sixth possible implementation manner of the first aspect, in a seventh possible implementation manner of the first aspect, the codec scheme includes AMR-NB, AMR-WB, enhanced voice services narrowband codec (EVS-NB for short), enhanced voice services wideband codec (EVS-WB for short), enhanced voice services super wideband codec (EVS-SWB for short), and enhanced voice services fullband codec (EVS-FB for short), where if the high voice quality codec scheme is EVS-FB, the low voice quality codec scheme is EVS-SWB, EVS-WB, EVS-NB, AMR-WB, or AMR-NB;

if the high voice quality codec scheme is the EVS SWB, the low voice quality codec scheme is EVS-WB, EVS-NB, AMR-WB, or AMR-NB;

if the high voice quality codec scheme is EVS-WB, the low voice quality codec scheme is EVS-NB, AMR-WB, or AMR-NB;

if the high voice quality codec scheme is EVS-NB, the low voice quality codec scheme is AMR-WB or AMR-NB; and if the high voice quality codec scheme is AMR-WB, the low voice quality codec scheme is AMR-NB.

According to a second aspect, a network device is provided, where the network device is capable of providing a voice service of a high voice quality codec scheme, and the network device includes:

a determining unit, configured to determine whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing the voice service of the high voice quality codec scheme; and a setup unit, configured to: if at least one logical functional entity that is capable of providing only the voice service of the low voice quality codec scheme exists, in the link, between the network device and the second terminal, set up, for the first terminal, a radio bearer used to perform the voice service of the high voice quality codec scheme.

With reference to the second aspect, in a first possible implementation manner of the second aspect, the network device further includes a conversion unit, configured to:

receive voice data of the high voice quality codec scheme, and perform down-sampling conversion to convert the voice data of the high voice quality codec scheme into voice data of the low voice quality codec scheme before sending;

or, receive voice data of the low voice quality codec scheme, and perform spread spectrum conversion to convert the voice data of the low voice quality codec scheme into voice data of the high voice quality codec scheme before sending.

With reference to the second aspect or the first possible implementation manner of the second aspect, in a second possible implementation manner of the second aspect, the setup unit is further configured to:

if no radio bearer has been set up for the first terminal, set up, for the first terminal, a new radio bearer used to perform the voice service of the high voice quality codec scheme; or if a radio bearer used to perform the voice service of the high voice quality codec scheme has been set up for the first terminal, keep the radio bearer of the first terminal unchanged.

With reference to the second aspect, the first possible implementation manner of the second aspect, or the second possible implementation manner of the second aspect, in a third possible implementation manner of the second aspect, the network device is a radio access network device;

the determining unit is further configured to:

receive an assignment message that is sent by a core network device and that is used to set up a voice service radio bearer, where if the assignment message instructs to set up a radio bearer of the low voice quality codec scheme, at least one logical functional entity that is capable of providing only the voice service of the low voice quality codec scheme exists, in the link, between the network device and the second terminal; and the setup unit is further configured to:

set up, for the first terminal, the radio bearer used to perform the voice service of the high voice quality codec scheme, and send an instruction message to the first terminal, where the instruction message is used to instruct the first terminal to configure a protocol layer for high voice quality.

With reference to the second aspect, the first possible implementation manner of the second aspect, or the second possible implementation manner of the second aspect, in a fourth possible implementation manner of the second aspect, the network device is the first terminal;

the determining unit is further configured to:

receive an instruction message sent by a radio access network device for configuring a protocol layer, where if the instruction message instructs to configure a protocol layer for low voice quality, at least one logical functional entity that is capable of providing only the voice service of the low voice quality codec scheme exists, in the link, between the network device and the second terminal; and the setup unit is further configured to:

configure a protocol layer for high voice quality.

With reference to the second aspect, the first possible implementation manner of the second aspect, or the second possible implementation manner of the second aspect, in a fifth possible implementation manner of the second aspect, the network device is a core network device, and the setup unit is further configured to:

send, to a radio access network device that provides a service to the first terminal, an assignment message used to set up the radio bearer of the voice service of the high voice quality codec scheme.

With reference to the fifth possible implementation manner of the second aspect, in a sixth possible implementation manner of the second aspect, the setup unit is further configured to:

send, to a radio access network device that provides a service to the second terminal, an assignment message used to set up a radio bearer of the voice service of the low voice quality codec scheme.

With reference to the second aspect or any one of the first possible implementation manner of the second aspect to the sixth possible implementation manner of the second aspect, in a seventh possible implementation manner of the second aspect, the codec scheme includes AMR-NB, AMR-WB, EVS-NB, EVS-WB, EVS-SWB, and EVS-FB, where if the high voice quality codec scheme is EVS-FB, the low voice quality codec scheme is EVS-SWB, EVS-WB, EVS-NB, AMR-WB, or AMR-NB;

if the high voice quality codec scheme is the EVS SWB, the low voice quality codec scheme is EVS-WB, EVS-NB, AMR-WB, or AMR-NB;

if the high voice quality codec scheme is EVS-WB, the low voice quality codec scheme is EVS-NB, AMR-WB, or AMR-NB;

if the high voice quality codec scheme is EVS-NB, the low voice quality codec scheme is AMR-WB or AMR-NB; and if the high voice quality codec scheme is AMR-WB, the low voice quality codec scheme is AMR-NB.

According to a third aspect, a network device is provided, where the network device is capable of providing a voice service of a high voice quality codec scheme, and the network device includes:

a processor, configured to determine whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing the voice service of the high voice quality codec scheme; where the processor is further configured to: if at least one logical functional entity that is capable of providing only the voice service of the low voice quality codec scheme exists, in the link, between the network device and the second terminal, set up, for the first terminal, a radio bearer used to perform the voice service of the high voice quality codec scheme.

With reference to the third aspect, in a first possible implementation manner of the third aspect, the network device further includes:

a first receiver, configured to receive voice data; where the processor is further configured to perform down-sampling conversion or spread spectrum conversion on the voice data received by the receiver; and a first transmitter, configured to send voice data obtained by means of the conversion by the processor.

With reference to the third aspect or the first possible implementation manner of the third aspect, in a second possible implementation manner of the third aspect, the processor is further configured to:

if no radio bearer has been set up for the first terminal, set up, for the first terminal, a new radio bearer used to perform the voice service of the high voice quality codec scheme; or if a radio bearer used to perform the voice service of the high voice quality codec scheme has been set up for the first terminal, keep the radio bearer of the first terminal unchanged.

With reference to the third aspect, the first possible implementation manner of the third aspect, or the second possible implementation manner of the third aspect, in a third possible implementation manner of the third aspect, the network device is a radio access network device;

the network device further includes: a second receiver, configured to receive a control-plane message; and a second transmitter, configured to send a control-plane message;

the processor is further configured to:

receive, by using the second receiver, an assignment message that is sent by a core network device and that is used to set up a voice service radio bearer, where if the assignment message instructs to set up a radio bearer of the low voice quality codec scheme, at least one logical functional entity that is capable of providing only the voice service of the low voice quality codec scheme exists, in the link, between the network device and the second terminal; and the processor is further configured to:

set up, for the first terminal, the radio bearer used to perform the voice service of the high voice quality codec scheme, and send, by using the second transmitter, an instruction message to the first terminal, where the instruction message is used to instruct the first terminal to configure a protocol layer for high voice quality.

With reference to the third aspect, the first possible implementation manner of the third aspect, or the second possible implementation manner of the third aspect, in a fourth possible implementation manner of the third aspect, the network device is the first terminal;

the network device further includes: a second receiver, configured to receive a control-plane message;

the processor is further configured to:

receive, by using the second receiver, an instruction message sent by a radio access network device for configuring a protocol layer, where if the instruction message instructs to configure a protocol layer for low voice quality, at least one logical functional entity that is capable of providing only the voice service of the low voice quality codec scheme exists, in the link, between the network device and the second terminal; and the processor is further configured to:

configure a protocol layer for high voice quality.

With reference to the third aspect, the first possible implementation manner of the third aspect, or the second possible implementation manner of the third aspect, in a fifth possible implementation manner of the third aspect, the network device is a core network device; the network device further includes: a second transmitter, configured to send a control-plane message; and the processor is further configured to:

send, by using the second transmitter to a radio access network device that provides a service to the first terminal, an assignment message used to set up the radio bearer of the voice service of the high voice quality codec scheme.

With reference to the fifth possible implementation manner of the third aspect, in a sixth possible implementation manner of the third aspect, the processor is further configured to:

send, by using the second transmitter to a radio access network device that provides a service to the second terminal, an assignment message used to set up a radio bearer of the voice service of the low voice quality codec scheme.

With reference to the third aspect or any one of the first possible implementation manner of the third aspect to the sixth possible implementation manner of the third aspect, in a seventh possible implementation manner of the third aspect, the codec scheme includes AMR-NB, AMR-WB, EVS-NB, EVS-WB, EVS-SWB, and EVS-FB, where if the high voice quality codec scheme is EVS-FB, the low voice quality codec scheme is EVS-SWB, EVS-WB, EVS-NB, AMR-WB, or AMR-NB;

if the high voice quality codec scheme is the EVS SWB, the low voice quality codec scheme is EVS-WB, EVS-NB, AMR-WB, or AMR-NB;

if the high voice quality codec scheme is EVS-WB, the low voice quality codec scheme is EVS-NB, AMR-WB, or AMR-NB;

if the high voice quality codec scheme is EVS-NB, the low voice quality codec scheme is AMR-WB or AMR-NB; and if the high voice quality codec scheme is AMR-WB, the low voice quality codec scheme is AMR-NB.

According to the method for setting up a radio bearer and the network device that are provided in the embodiments of the present invention, the network device is capable of providing a voice service of a high voice quality codec scheme; it is determined whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing the voice service of the high voice quality codec scheme; and if at least one logical functional entity that is capable of providing only the voice service of the low voice quality codec scheme exists, in the link, between the network device and the second terminal, a radio bearer used to perform the voice service of the high voice quality codec scheme is set up for the first terminal. In this way, when at least one logical functional entity that is capable of providing only the voice service of the low voice quality codec scheme exists, in the link, between the network device and the second terminal, the radio bearer set up by the network device for the first terminal is a radio bearer for performing the voice service of the high voice quality codec scheme and is not restricted by a service capability of a logical functional entity between the network device and the second terminal. This overcomes a defect in the prior art that a type of a radio bearer for performing a voice service depends on a voice service codec capability that is the lowest in voice service codec capabilities of all communications devices. Therefore, the present invention implements that a user on a side of a terminal that is capable of providing the voice service of a high-quality codec scheme can experience a high-definition voice service, so that user experience of the terminal is consistent with a capability of the terminal, thereby improving user experience.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

For better understanding of the present invention, the following describes a detailed process of a prior-art voice service involved in the background of this specification.

Figure 1:
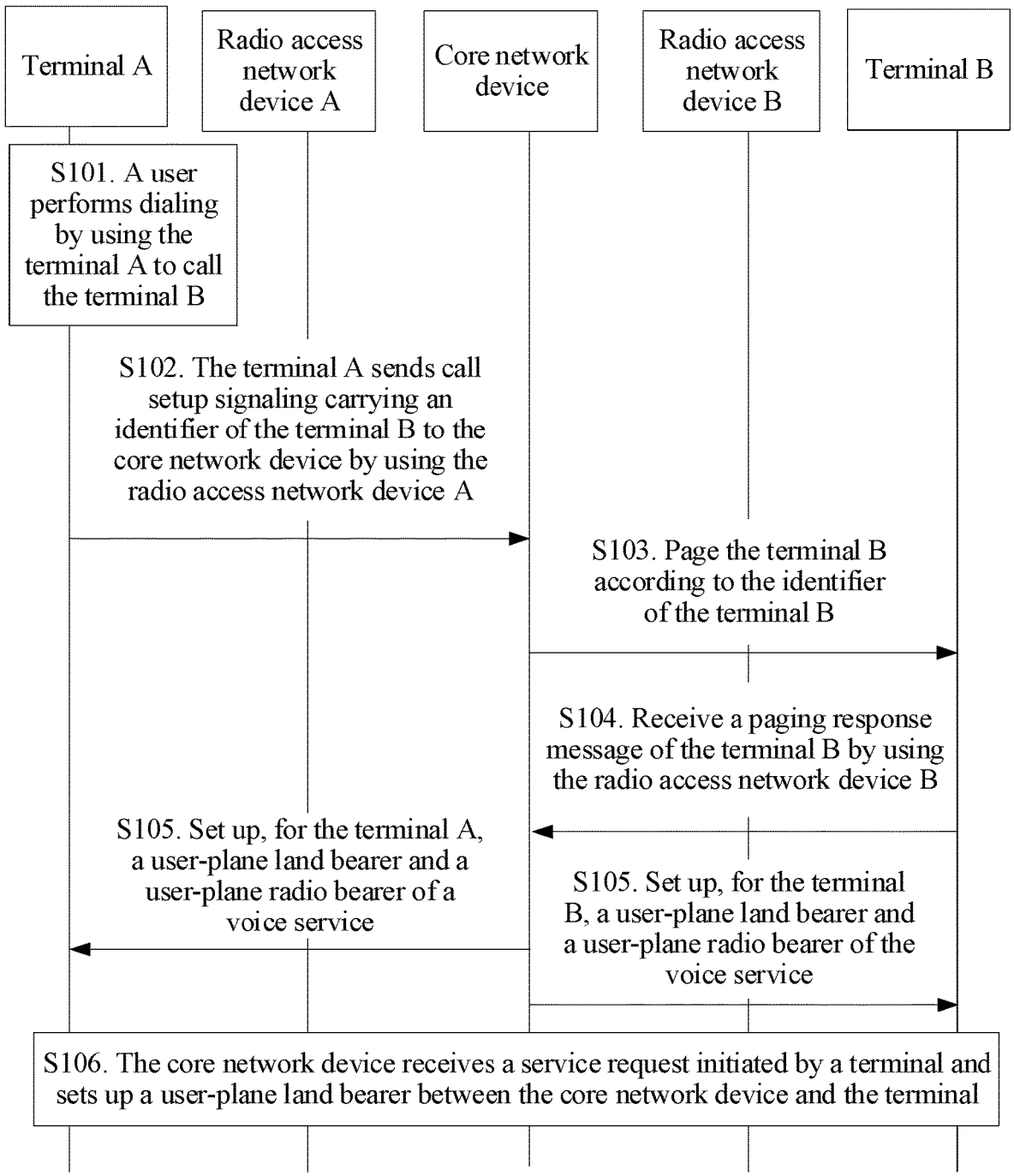
FIG. 1 is a schematic flowchart of a method for setting up a radio bearer in the prior art.

Exemplarily, when a terminal A (calling terminal) calls a terminal B (called terminal), as shown in FIG. 1, a procedure for setting up a voice service specifically includes:

S101. A user performs dialing by using the terminal A to call the terminal B.

S102. The terminal A sends call setup (Call Setup) signaling carrying an identifier of the terminal B to a core network device by using a radio access network device A.

It should be noted that, in an execution process of S102, when the radio access network device A receives the call setup signaling sent by the terminal A, a control-plane radio bearer is set up between the terminal A and the radio access network A; and when the core network device receives the call setup signaling that is sent by the terminal A and that is forwarded by the radio access network device A, a control-plane land bearer is set up between the terminal A and a core network.

The identifier of the terminal B may be a mobile subscriber integrated service digital network (MS ISDN for short) number of the terminal B.

Certainly, the identifier of the terminal may also be other information, as long as the terminal can be identified uniquely on a network, which is not limited herein.

S103. The core network device pages the terminal B according to the identifier of the terminal B.

It should be noted that a process of paging the terminal B by the core network device may be implemented according to an actual requirement, which is not limited herein, as long as the terminal B can be reached by paging.

S104. The core network device receives a paging response message of the terminal B by using a radio access network device B.

When the core network device receives the paging response message, it indicates that the paging the terminal B is successful.

S105. The core network device separately sets up, for the terminal A and the terminal B, a user-plane land bearer and a user-plane radio bearer of a voice service.

The user-plane land bearer is a user-plane connection between the core network device and the radio access network device. The user-plane radio bearer is a user-plane connection between the radio access network device and the terminal.

Optionally, solutions for separately setting up, by the core network device for the terminal A and the terminal B, a voice service radio bearer may include at least the following two solutions:

A first solution is as follows:

The core network device separately sets up, for the terminal A and the terminal B according to a voice service codec capability of the terminal A, a voice service codec capability of the radio access network device A, a voice service codec capability of the terminal B, a voice service codec capability of the radio access network device B, and a voice service codec capability configured on the core network device itself, a voice service radio bearer corresponding to a voice service codec capability that is the lowest among the five.

Exemplarily, in scenario 1, it is assumed that the terminal A and the radio access network device A are capable of providing only an AMR-NB voice service, that the terminal B and the radio access network device B are capable of providing AMR-WB and AMR-NB voice services, and that the core network device is configured to provide the AMR-NB and AMR-WB voice services.

In scenario 2, it is assumed that the terminal A and the radio access network device A are capable of providing the AMR-WB and AMR-NB voice services, that the terminal B and the radio access network device B provide only the AMR-NB voice service, and that the core network device is configured to provide the AMR-NB and AMR-WB voice services.

The foregoing scenario 1 and scenario 2 are used as example. In whichever scenario, the AMR-NB voice service is provided by a capability that is the lowest among the five, that is, the voice service codec capability of the terminal A, the voice service codec capability of the radio access network device A, the voice service codec capability of the terminal B, the voice service codec capability of the radio access network device B, and the voice service codec capability configured on the core network device itself, and therefore, the core network separately sets up, for the terminal A and the terminal B, a land bearer and a radio bearer of the AMR-NB voice service.

Specifically, setting up, by the core network device for the terminal A, the land bearer and the radio bearer of the AMR-NB voice service specifically includes the following step 1 to step 5:

Step 1. The core network device sends an AMR-NB service assignment to the radio access network device A.

Step 2. The radio access network device A sets up a land bearer with the core network device and sets up an AMR-NB radio bearer with the terminal A.

Step 3. The terminal A configures an AMR-NB protocol layer.

Step 4. The terminal A sends a radio bearer response message to the radio access network device A.

Step 5. The radio access network device A sends an assignment response message to the core network device.

It should be noted that a process of setting up, by the core network device for the terminal B, the land bearer and the radio bearer of the AMR-NB voice service is similar to that of the foregoing step 1 to step 5, and details are not described herein again.

A second solution includes the following processes (not shown).

Process A.

The core network device sets up, for the terminal A according to a highest voice service codec capability of the terminal A, the voice service codec capability of the radio access network device A, and the voice service codec capability configured on the core network device itself, a land bearer and a radio bearer of a voice service corresponding to a capability that is the lowest among the three.

Exemplarily, the foregoing scenario 1 is used as an example. The voice service codec capability of the terminal A is the lowest; therefore, the core network sets up, for the terminal A, the land bearer and the radio bearer of the AMR-NB voice service.

Exemplarily, the foregoing scenario 2 is used as an example. The voice service codec capabilities of the terminal A, the radio access network device A, and the core network device are consistent, all capable of providing the AMR-WB voice service, and therefore, the core network sets up, for the terminal A, a radio bearer of the AMR-WB voice service.

It should be noted that setting up, by the core network for the terminal A, a connection and the radio bearer of the AMR-WB voice service is similar to the setting up a connection and the radio bearer of the AMR-NB voice service in the foregoing step 1 to step 5, only an assigned service type being different. Details are not described herein again.

Process B.

The core network device sets up, for the terminal B according to the voice service codec capability of the terminal B, the voice service codec capability of the radio access network device B, the voice service codec capability configured on the core network device itself, and a type of the radio bearer that is of the voice service and that is set up for the terminal A, a land bearer and a radio bearer of a voice service corresponding to a capability that is the lowest among the four.

It should be noted that a process of setting up a land bearer and a radio bearer for a terminal is already described in detail in the foregoing step 1 to step 5, and details are not described herein again.

Exemplarily, the scenario 1 in S105 is used as an example. The core network sets up, for the terminal A, the land bearer and the radio bearer of the AMR-NB voice service, the terminal B and the radio access network device B are capable of providing the AMR-WB and AMR-NB voice services, and the core network device is capable of providing the AMR-WB and AMR-NB voice services. A capability of the land bearer and the radio bearer that are of the AMR-NB voice service and are set up by the core network for the terminal A is the lowest, and therefore, the core network device sets up, for the terminal B, the land bearer and the radio bearer of the AMR-NB voice service.

Exemplarily, the scenario 2 in S105 is used as an example. The core network sets up, for the terminal A, a land bearer and the radio bearer of the AMR-WB voice service, the terminal B and the radio access network device B are capable of providing AMR-NB, and the core network device is capable of providing the AMR-WB and AMR-NB voice services. The terminal B and the radio access network device B are of the lowest capability, and therefore, the core network sets up, for the terminal B, the land bearer and the radio bearer of the AMR-NB voice service.

Process C.

The core network device determines whether a type of the land bearer and the radio bearer that are set up in process B is consistent with that of the land bearer and the radio bearer that are set up in process A.

If the type of the land bearer and the radio bearer that are set up in process B is consistent with that of the land bearer and the radio bearer that are set up in process A, step S105 is ended. If the type of the land bearer and the radio bearer that are set up in process B is inconsistent with that of the land bearer and the radio bearer that are set up in process A, a process D will be executed.

Exemplarily, the foregoing scenario 1 is used as an example. The type of the land bearer and the radio bearer that are set up in S1052 is consistent with that of the land bearer and the radio bearer that are set up in S1051, step S105 is ended.

Exemplarily, the foregoing scenario 2 is used as an example. The type of the land bearer and the radio bearer that are set up in process B is inconsistent with that of the land bearer and the radio bearer that are set up in process A, process D will be executed.

Process D.

The core network device modifies the type of the land bearer and the radio bearer of the terminal A to be consistent with that of the land bearer and the radio bearer of the terminal B.

Specifically, a process of modifying the radio bearer is similar to the process of setting up the land bearer and the radio bearer, and details are not described herein again.

Further, after process D, process C is executed again.

It should be noted that, if S105 is implemented by using the first solution, S105 is executed after S104; and if S105 is implemented by using the second solution, there is no time order for executing process A and S104, but process B is executed after S104.

After S105, S106 is executed.

S106. The core network device receives a service request initiated by a terminal and sets up a user-plane land bearer between the core network device and the terminal.

The terminal A begins to perform a voice service with the terminal B hereto, that is, beginning a call.

During the call, both ends generate AMR-NB voice signals and send the AMR-NB voice signals to the peer end thereof.

It can be learned from the foregoing process that as long as one end of the terminals is capable of providing only the AMR-NB voice service, the AMR-NB voice service is performed between the two ends.

Embodiment 1

Embodiment 1 of the present invention provides a method for setting up a radio bearer, applied to a network device, where the network device is capable of providing a voice service of a high voice quality codec scheme.

Specifically, the being capable of providing a voice service of a high voice quality codec scheme means that a voice service codec capability of the device is configured as the high voice quality codec scheme, and that the function is enabled.

Optionally, the enabling of the function may be controlled by using a switch or a license.

Figure 2:
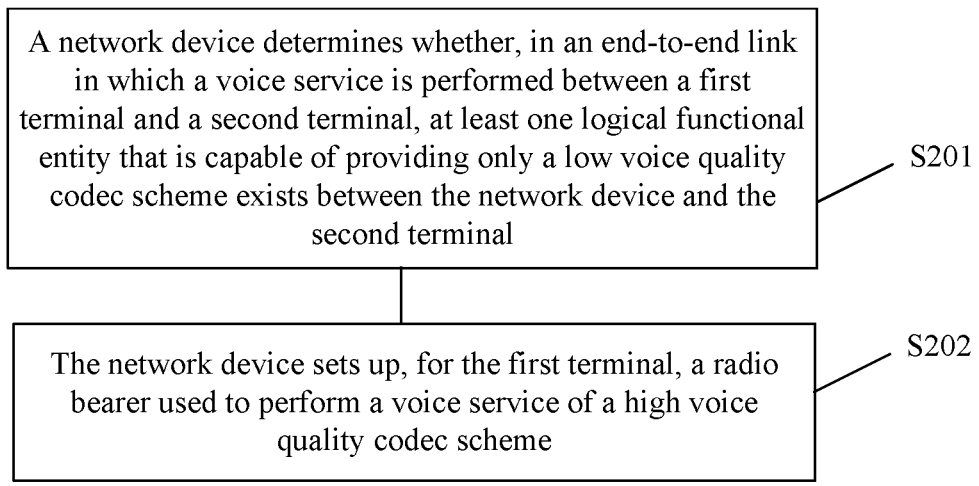
FIG. 2 is a schematic flowchart of a method for setting up a radio bearer according to an embodiment of the present invention.

As shown in FIG. 2, the method may include the following steps:

S201. The network device determines whether, in an end-to-end link in which a voice service is performed between a first terminal and a second terminal, at least one logical functional entity that is capable of providing only a voice service of a low voice quality codec scheme exists between the network device and the second terminal.

All logical functional entities, in the link, between the network device and the first terminal are capable of providing the voice service of the high voice quality codec scheme.

Specifically, the being capable of providing a voice service of a low voice quality codec scheme means that a voice service codec capability of the device is the low voice quality codec scheme; or, the being capable of providing a voice service of a low voice quality codec scheme means that a voice service codec capability of the device is configured as the high voice quality codec scheme and that the function is disabled.

Optionally, the disabling of the function may be controlled by using a switch or a license.

Optionally, when the network device is the first terminal, the network device may be a calling terminal, or may be a called terminal, which is not limited in the present invention.

The network device may be a radio access network device or a core network device providing a service for the first terminal; or, the network device is the first terminal.

Specifically, the logical functional entity refers to a collection of at least one physical network element that supports a voice service function. Optionally, the logical functional entity may be a single physical network element, or may be multiple physical network elements, which is not limited in the present invention.

Further, when the network device is the first terminal, the network device may be a mobile terminal, or may be a fixed terminal, which is not limited in the present invention, either.

Optionally, when the network device is a different physical network element, a specific process of the determining, by the network device, whether, in an end-to-end link in which a voice service is performed between a first terminal and a second terminal, at least one logical functional entity that is capable of providing only a voice service of a low voice quality codec scheme exists between the network device and the second terminal is different and may specifically include but is not limited to the following three solutions:

Solution 1: The network device is the core network device.

Optionally, in the solution 1, the core network device may perform determining by executing S201 after the core network device receives a voice service codec capability of each logical functional entity reported by each logical functional entity itself.

A process of receiving, by the core network device, the voice service codec capability of each logical functional entity reported by each logical functional entity itself is not limited in the present invention and may be set according to an actual requirement.

Optionally, in the solution 1, the voice service codec capability of each logical functional entity on a network may also be preconfigured on the core network device, and the core network device directly reads the voice service codec capability of each logical functional entity to perform determining by executing S201.

Solution 2: The network device is the radio access network device.

Optionally, in the solution 2, the determining whether, in an end-to-end link in which a voice service is performed between a first terminal and a second terminal, at least one logical functional entity that is capable of providing only a voice service of a low voice quality codec scheme exists between the network device and the second terminal may include:

receiving an assignment message that is sent by the core network device and that is used to set up a voice service radio bearer, where if the assignment message instructs to set up a radio bearer of the low voice quality codec scheme, at least one logical functional entity that is capable of providing only the low voice quality codec scheme exists, in the link, between the core network device and the second terminal.

Specifically, it may be learned from the method shown in FIG. 1 that, a type of the radio bearer that the assignment message sent by the core network device instructs to set up depends on a service capability that is the lowest in service capabilities of logical functional entities in the link. Therefore, if the assignment message instructs to set up the radio bearer of the low voice quality codec scheme, at least one logical functional entity that is capable of providing only the voice service of the low voice quality codec scheme exists, in the link, between the core network device and the second terminal, and a voice service codec capability of the radio access network device itself is the high voice quality codec scheme. Therefore, at least one logical functional entity that is capable of providing only the voice service of the low voice quality codec scheme exists, in the link, between the radio access network device and the second terminal.

Optionally, in the solution 2, a voice service codec capability of each logical functional entity on a network may also be preconfigured on the radio access network device, and the radio access network device directly reads the voice service codec capability of each logical functional entity to perform determining by executing S201.

Solution 3: The network device is the first terminal.

Optionally, in the solution 3, the determining whether, in an end-to-end link in which a voice service is performed between a first terminal and a second terminal, at least one logical functional entity that is capable of providing only a voice service of a low voice quality codec scheme exists between the network device and the second terminal may include:

receiving an instruction message that is sent by the radio access network device and that is used to configure a protocol layer, where if the instruction message instructs to configure a protocol layer for low voice quality, at least one logical functional entity that is capable of providing only the voice service of the low voice quality codec scheme exists, in the link, between the network device and the second terminal.

Specifically, it may be learned from the method shown in FIG. 1 that, a service type indicated in the instruction message sent by the radio access network device to the terminal is consistent with a type of a radio bearer that an assignment message sent by the core network device instructs to set up and depends on a service capability that is the lowest in service capabilities of logical functional entities in the link. Therefore, if the instruction message instructs to configure the protocol layer for low voice quality, at least one logical functional entity that is capable of providing only the voice service of the low voice quality codec scheme exists, in the link, between the radio access network device and the second terminal, and a voice service codec capability of the first terminal itself is the high voice quality codec scheme. Therefore, at least one logical functional entity that is capable of providing only the voice service of the low voice quality codec scheme exists, in the link, between the first terminal and the second terminal.

Optionally, in the solution 3, a voice service codec capability of each logical functional entity on a network may also be preconfigured on the radio access network device, and the radio access network device directly reads the voice service codec capability of each logical functional entity to perform determining by executing S201.

It should be noted that the foregoing three solutions impose no specific limitation to the process of executing S201. In an actual application, a specific process of executing S201 may be determined according to an actual requirement, and no specific limitation is set in the present invention.

Exemplarily, a codec scheme in all embodiments of the present invention may include but is not limited to the following manners (voice quality of a voice service provided by each codec scheme improves sequentially): AMR-NB, AMR-WB, EVS-NB, EVS-WB, EVS-SWB, and EVS-FB. Therefore, when a type of the high voice quality codec scheme is different, a definition of the low voice quality codec scheme may be different, which includes:

when the high voice quality codec scheme is EVS-FB, the low voice quality codec scheme may be EVS-SWB, EVS-WB, EVS-NB, AMR-WB, or AMR-NB;

when the high voice quality codec scheme is the EVS SWB, the low voice quality codec scheme may be EVS-WB, EVS-NB, AMR-WB, or AMR-NB;

when the high voice quality codec scheme is EVS-WB, the low voice quality codec scheme may be EVS-NB, AMR-WB, or AMR-NB;

when the high voice quality codec scheme is EVS-NB, the low voice quality codec scheme may be AMR-WB or AMR-NB; and when the high voice quality codec scheme is AMR-WB, the low voice quality codec scheme may be AMR-NB.

It should be noted that the foregoing enumerated codec schemes are not limitations to a codec scheme in a voice service mentioned in the present invention. In an actual application, a type of a high voice quality codec scheme and a type of a corresponding low voice quality codec scheme thereof may be set according to an actual requirement, and no specific limitation is set in the present invention. Any radio bearer set up by using a solution of the present invention shall fall within the protection scope of the present invention.

Optionally, if at least one logical functional entity that is capable of providing only the voice service of the low voice quality codec scheme exists, in the link, between the network device and the second terminal, S202 is executed.

Optionally, if all logical functional entities, in the link, between the network device and the second terminal are capable of providing the voice service of the high voice quality codec scheme, it indicates that all logical functional entities in the link in which the voice service is performed between the first terminal and the second terminal are capable of providing the voice service of the high voice quality codec scheme, and a radio bearer for performing a voice service of high voice quality may be set up for the first terminal and the second terminal. A specific setup method is already described in detail in the solution in FIG. 1, and details are not described herein again.

S202. The network device sets up, for the first terminal, a radio bearer used to perform a voice service of a high voice quality codec scheme.

Specifically, the setting up, for the first terminal, a radio bearer used to perform a voice service of a high voice quality codec scheme may include but is not limited to the following two cases:

A first case is as follows:

If no radio bearer has been set up for the first terminal, set up, for the first terminal, a new radio bearer used to perform the voice service of the high voice quality codec scheme.

The first case is a case in which the radio bearer is set up for the first terminal for the first time.

A second case is as follows:

If a radio bearer used to perform the voice service of the high voice quality codec scheme has been set up for the first terminal, the radio bearer of the first terminal is kept unchanged.

The second case is a case in which, after a radio bearer has been set up for the first terminal for the first time, a type of the radio bearer set up for the first terminal needs to be modified due to a performance limitation of a system and an assignment is performed for a second time (that is, a late assignment).

Optionally, when the network device is a different physical network element, a specific process of the setting up, for the first terminal, a radio bearer used to perform a voice service of a high voice quality codec scheme is also different and may include the following three cases:

A first case is that the network device is the core network device.

In this case, the setting up, for the first terminal, a radio bearer used to perform a voice service of a high voice quality codec scheme may include:

sending, to a radio access network device that provides a service to the first terminal, an assignment message used to set up the radio bearer of the voice service of the high voice quality codec scheme.

Further, in the first case, the network device is the core network device, and after the setting up, for the first terminal, a radio bearer used to perform a voice service of a high voice quality codec scheme, the method may further include: sending, to a radio access network device that provides a service to the second terminal, an assignment message used to set up a radio bearer of the voice service of the low voice quality codec scheme.

It should be noted that a specific process of setting up a radio bearer is already described in detail in the method shown in FIG. 1, and details are not described herein again.

A second case is that the network device is a radio access network device.

In this case, the setting up, for the first terminal, a radio bearer used to perform a voice service of a high voice quality codec scheme may include:

setting up, for the first terminal, the radio bearer used to perform the voice service of the high voice quality codec scheme, and sending a first instruction message to the first terminal, where the first instruction message is used to instruct the first terminal to configure a protocol layer for high voice quality.

A third case is that the network device is the first terminal.

In this case, the setting up, for the first terminal, a radio bearer used to perform a voice service of a high voice quality codec scheme may include:

configuring, by the first terminal, a protocol layer for high voice quality.

In this way, according to the method for setting up a radio bearer provided in this embodiment of the present invention, the radio bearer set up by the network device for the first terminal is different from a service capability of a logical functional entity, in the link, between the network device and a second terminal. It is equivalent that an isolation and conversion function is configured on the network device, and a control-plane message is isolated by using the function, thereby achieving an objective that types of radio bearers set up on two sides of the network device are different.

Further, after the setting up, for the first terminal, a radio bearer used to perform a voice service of a high voice quality codec scheme, the method may further include:

receiving voice data of the high voice quality codec scheme, and performing down-sampling conversion to convert the voice data of the high voice quality codec scheme into voice data of the low voice quality codec scheme before sending;

or, receiving voice data of the low voice quality codec scheme, and performing spread spectrum conversion to convert the voice data of the low voice quality codec scheme into voice data of the high voice quality codec scheme before sending.

In this way, after converting a type of the received voice data into a type that is suitable for transmission by using a radio bearer that is about to transmit the voice data, the network device sends converted voice data. It is equivalent that the isolation and conversion function is configured on the network device, and user-plane data is converted by using the function, thereby achieving an objective of converting different types of user data on the two sides of the network device.

It should be noted that the method for setting up a radio bearer according to all embodiments of the present invention may be applied to various types of communications standards, where the various types of communications standards may include but are not limited to any one of the following standards: the Global System for Mobile Communications (GSM for short), the Wideband Code Division Multiple Access (WCDMA for short) system, the Time Division-Synchronous Code Division Multiple Access (TTD-SCDMA for short) system, the Code Division Multiple Access (CDMA for short) system, and Long Term Evolution (LTE for short).

Further, in different standards, types of the radio access network device and the core network device that are described in all the embodiments of the present invention are different.

The types of the radio access network device and the core network device that are described in all the embodiments of the present invention include but are not limited to the following:

If the communications network is a WCDMA system or a TD-SCDMA system, the radio access network device is a radio network controller (RNC for short), and the core network device is a mobile switching center (MSC for short).

If the communications network is a GSM system or a CDMA system, the radio access network device is a base station controller (BSC for short), and the core network device is an MSC.

If the communications network is an LTE system, the radio access network device is an evolved NodeB (EeNodeB for short), and the core network device is a mobility management entity (MME for short).

The method for setting up a radio bearer provided in this embodiment of the present invention is applied to a network device, where the network device is capable of providing a voice service of a high voice quality codec scheme; it is determined whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing the voice service of the high voice quality codec scheme; and if at least one logical functional entity that is capable of providing only the voice service of the low voice quality codec scheme exists, in the link, between the network device and the second terminal, a radio bearer used to perform the voice service of the high voice quality codec scheme is set up for the first terminal. In this way, when at least one logical functional entity that is capable of providing only the voice service of the low voice quality codec scheme exists, in the link, between the network device and the second terminal, the radio bearer set up by the network device for the first terminal is a radio bearer for performing the voice service of the high voice quality codec scheme and is not restricted by a service capability of a logical functional entity between the network device and the second terminal. This overcomes a defect in the prior art that a type of a radio bearer for performing a voice service depends on a voice service codec capability that is the lowest in voice service codec capabilities of all communications devices. Therefore, the present invention implements that a user on a side of a terminal that is capable of providing the voice service of a high-quality codec scheme can experience a high-definition voice service, so that user experience of the terminal is consistent with a capability of the terminal, thereby improving user experience.

Embodiment 2

Embodiment 2 of the present invention provides another method for setting up a radio bearer. A process of interaction between a core network device, a radio access network device, and a terminal and a voice service procedure in which a terminal A (a calling terminal) calls a terminal B (a called terminal) are used as an example to describe in detail the method for setting up a radio bearer described in Embodiment 1.

Optionally, it is assumed that a voice service codec capability of each physical network element on a network and whether an isolation and conversion function is configured (whether the method for setting up a radio bearer provided in the present invention is executed) are shown in Table 1.

TABLE 1

| Network element name | Voice service codec capability | Whether an isolation and conversion function is configured |
|---|---|---|
| Terminal A | AMR-NB | Not limited |
| Radio access network A | AMR-NB | Not limited |
| Core network device | AMR-WB | Not configured |
| | AMR-NB | Not limited |
| Radio access network B | AMR-WB | Configured |
| Terminal B | AMR-WB | Not limited |

Figure 3A:
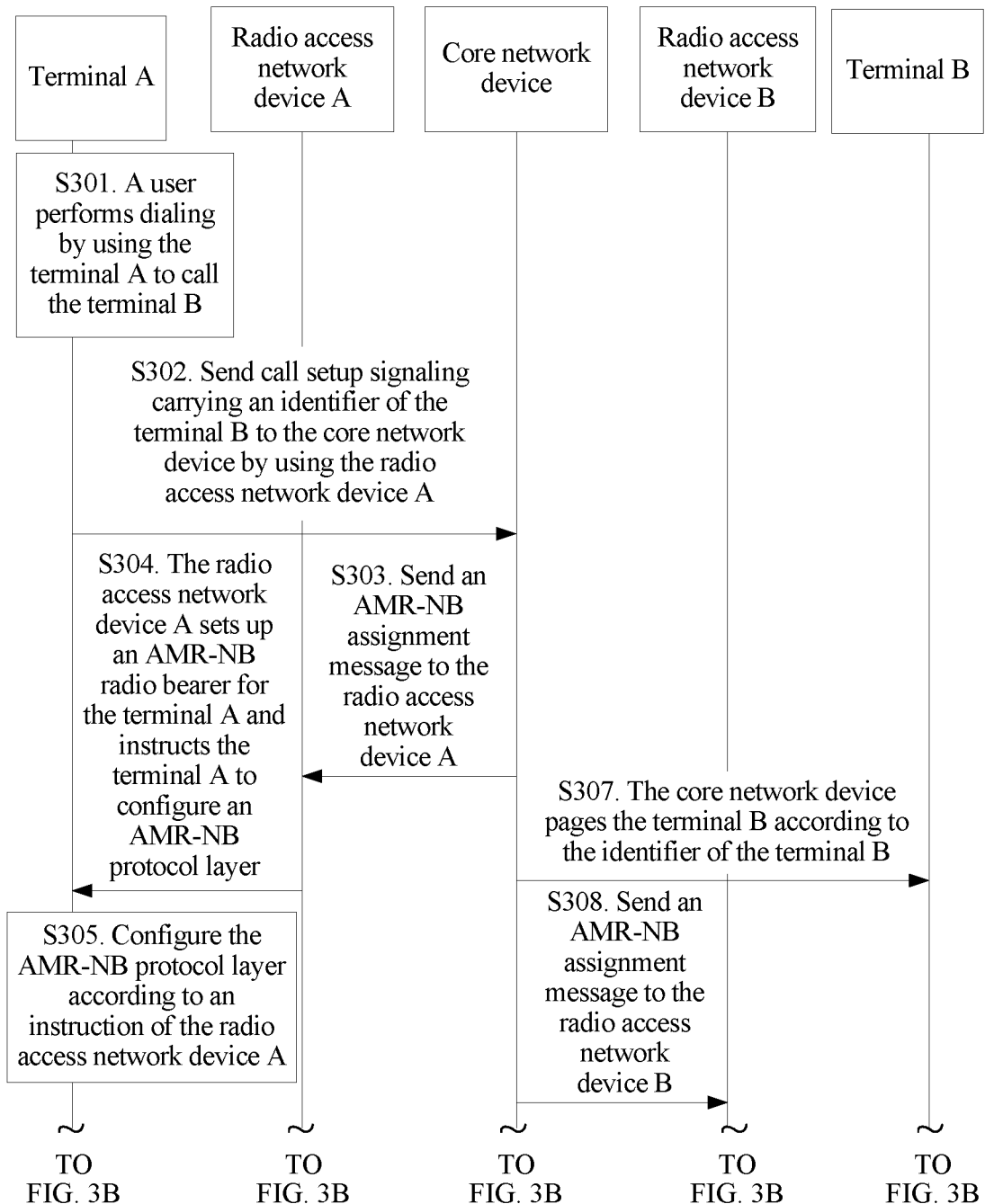
FIG. 3A and FIG. 3B are a schematic flowchart of another method for setting up a radio bearer according to an embodiment of the present invention.
Figure 3B:
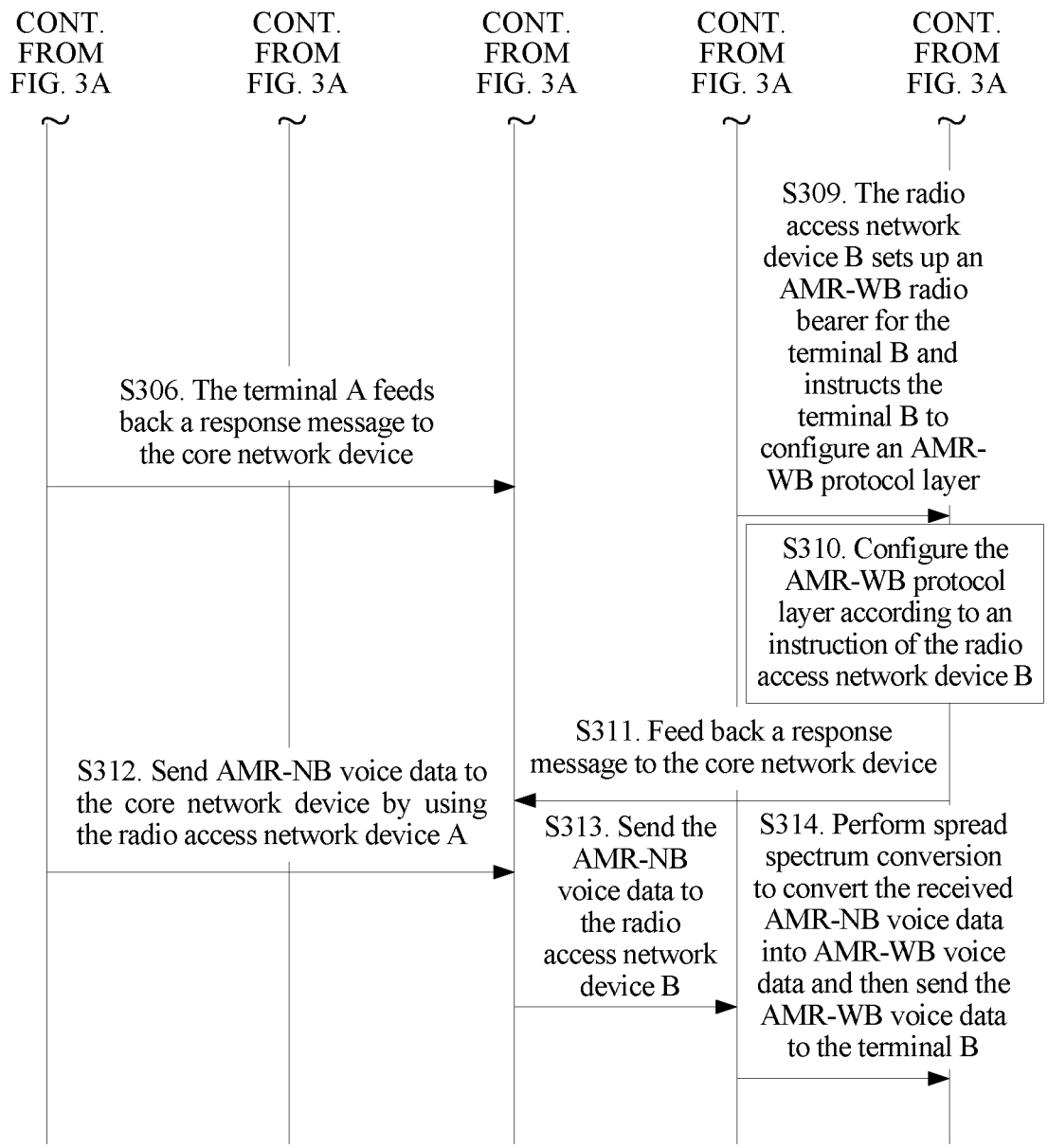

In a scenario shown in Table 1, referring to FIG. 3A and FIG. 3B, the method may include the following steps:

S301. A user performs dialing by using the terminal A to call the terminal B.

S302. The terminal A sends call setup signaling carrying an identifier of the terminal B to the core network device by using the radio access network device A.

S303. The core network device sends an AMR-NB assignment message to the radio access network device A according to the voice service codec capability of the terminal A, the voice service codec capability of the radio access network device A, and the voice service codec capability configured on the core network device itself.

The AMR-NB assignment message is used to set up a radio bearer for performing an AMR-NB voice service.

It should be noted that a process of setting up a radio bearer for a terminal is already introduced in the process of the method described in FIG. 1, and details are not described herein again.

S304. The radio access network device A sets up an AMR-NB radio bearer for the terminal A and instructs the terminal A to configure an AMR-NB protocol layer.

Regardless of whether the radio access network device A configures the isolation and conversion function, the AMR-NB radio bearer is set up for the terminal A in S304.

Specifically, if the radio access network device A has not configured the isolation and conversion function, the AMR-NB radio bearer is set up for the terminal A according to an instruction of the core network device.

If the radio access network device A has configured the isolation and conversion function, because the voice service codec capability of the core network device is AMR-NB, the radio access network device A still sets up the AMR-NB radio bearer for the terminal A.

S305. The terminal A configures the AMR-NB protocol layer according to an instruction of the radio access network device A.

Regardless of whether the terminal A configures the isolation and conversion function, the AMR-NB protocol layer is configured in S305.

Specifically, if the terminal A has not configured the isolation and conversion function, the AMR-NB protocol layer is configured according to the instruction of the radio access network device A.

If the terminal A has configured the isolation and conversion function, because the terminal A is capable of providing only the AMR-NB voice service, the terminal A still configures the AMR-NB protocol layer.

S306. The terminal A feeds back a response message to the core network device.

S307. The core network device pages the terminal B according to the identifier of the terminal B.

S308. The core network device sends an AMR-NB assignment message to the radio access network device B according to the voice service codec capability of the terminal B, the capability of the radio access network device B, the voice service codec capability configured on the core network device itself, and a type of the radio bearer set up for the terminal A.

The AMR-NB assignment message is used to set up a radio bearer for performing the AMR-NB voice service.

S309. The radio access network device B sets up an AMR-WB radio bearer for the terminal B and instructs the terminal B to configure an AMR-WB protocol layer.

Specifically, in S309, if the radio access network device B determines, according to the received assignment message, that at least one logical functional entity that is capable of providing only the AMR-NB voice service exists, in a link, between the radio access network B and the terminal A, and all logical functional entities, in the link, between the radio access network device B and the terminal B are capable of providing an AMR-WB voice service, sets up the AMR-WB radio bearer is set up for the terminal B and instructs the terminal B is instructed to configure the AMR-WB protocol layer.

S310. The terminal B configures the AMR-WB protocol layer according to an instruction of the radio access network device B.

Regardless of whether the terminal B configures the isolation and conversion function, the AMR-WB protocol layer is configured in S310.

Specifically, if the terminal B has not configured the isolation and conversion function, the AMR-WB protocol layer is configured according to the instruction of the radio access network device B.

If the terminal B has configured the isolation and conversion function, because the terminal B is capable of providing the AMR-WB voice service, the terminal B still configures the AMR-WB protocol layer.

S311. The terminal B feeds back a response message to the core network device.

Setting up a voice service radio bearer is complete hereto. A process of a voice call may be performed, and the method may further include:

S312. The terminal A sends AMR-NB voice data to the core network device by using the radio access network device A.

S313. The core network device sends the AMR-NB voice data to the radio access network device B.

S314. The radio access network device B performs spread spectrum conversion to convert the received AMR-NB voice data into AMR-WB voice data and then sends the AMR-WB voice data to the terminal B.

By means of S311 to S314, transmission of the voice data sent by the terminal A to the terminal B is complete.

Further, transmission of voice data sent by the terminal B to the terminal A completely reverses that from S311 to S314, and details are not described herein again.

The voice service between the terminal A and the terminal B is complete hereto.

Optionally, it is assumed that a voice service codec capability of each physical network element on a network and whether an isolation and conversion function is configured are shown in Table 2.

TABLE 2

| Network element name | Voice service codec capability | Whether an isolation and conversion function is configured |
|---|---|---|
| Terminal A | AMR-WB | Not limited |
| Radio access network A | AMR-WB | Configured |
| Core network device | AMR-NB | Not limited |
| Radio access network B | AMR-NB | Not limited |
| Terminal B | AMR-NB | Not limited |

In a scenario shown in Table 2, a process of performing a voice service between the terminal A and the terminal B is similar to that from S301 to S314. The only difference is that AMR-WB is on the side of the terminal A, and that AMR-NB is on the side of the terminal B, and details are not described herein again.

Optionally, it is assumed that a voice service codec capability of each physical network element on a network and whether an isolation and conversion function is configured are shown in Table 3.

TABLE 3

| Network element name | Voice service codec capability | Whether an isolation and conversion function is configured |
|---|---|---|
| Terminal A | AMR-WB | Not limited |
| Radio access network A | AMR-WB | Configured |
| Core network device | AMR-WB | Not configured |
| Radio access network B | AMR-NB | Not limited |
| Terminal B | AMR-NB | Not limited |

Figure 4A:
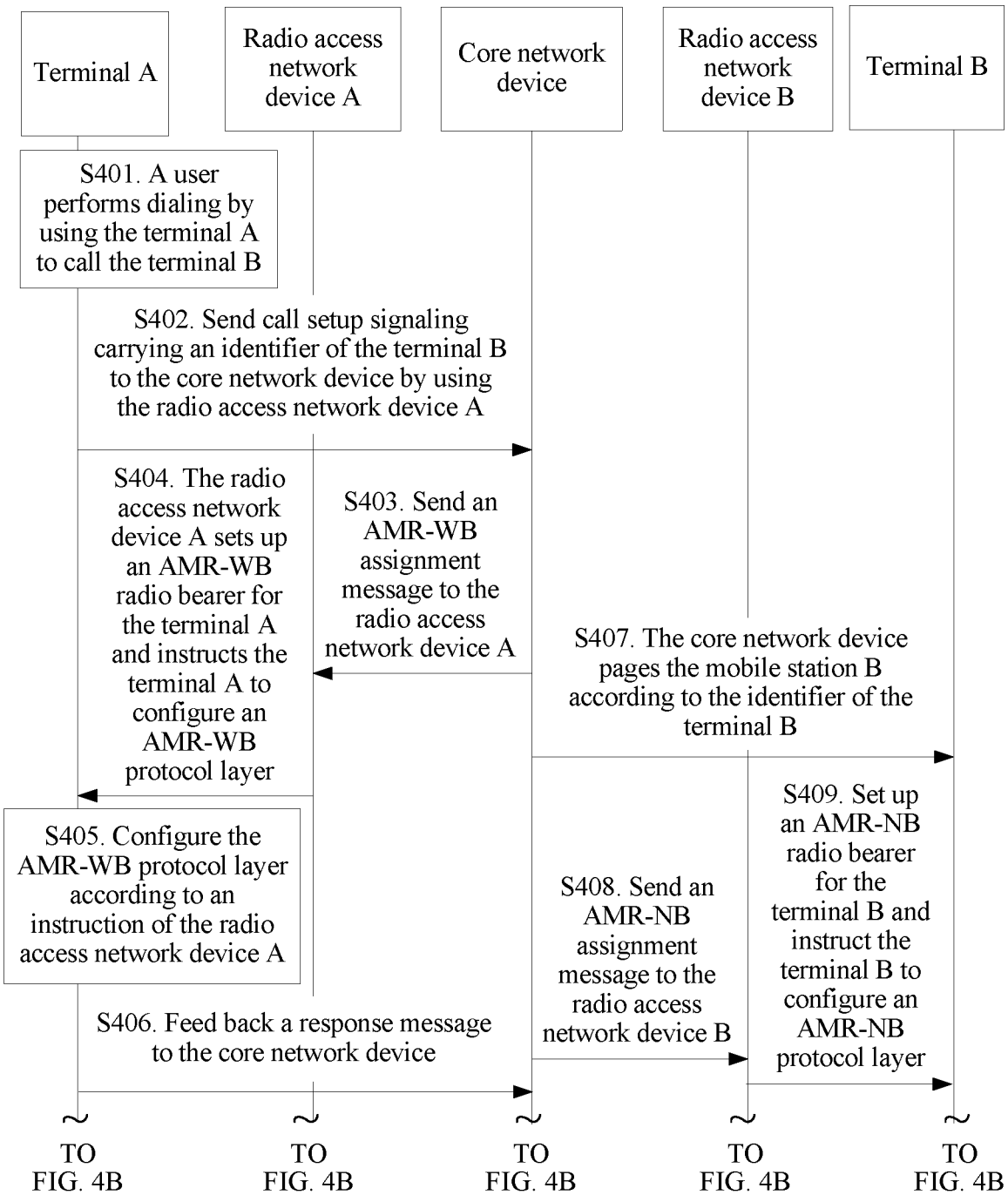
FIG. 4A and FIG. 4B are a schematic flowchart of still another method for setting up a radio bearer according to an embodiment of the present invention.
Figure 4B:
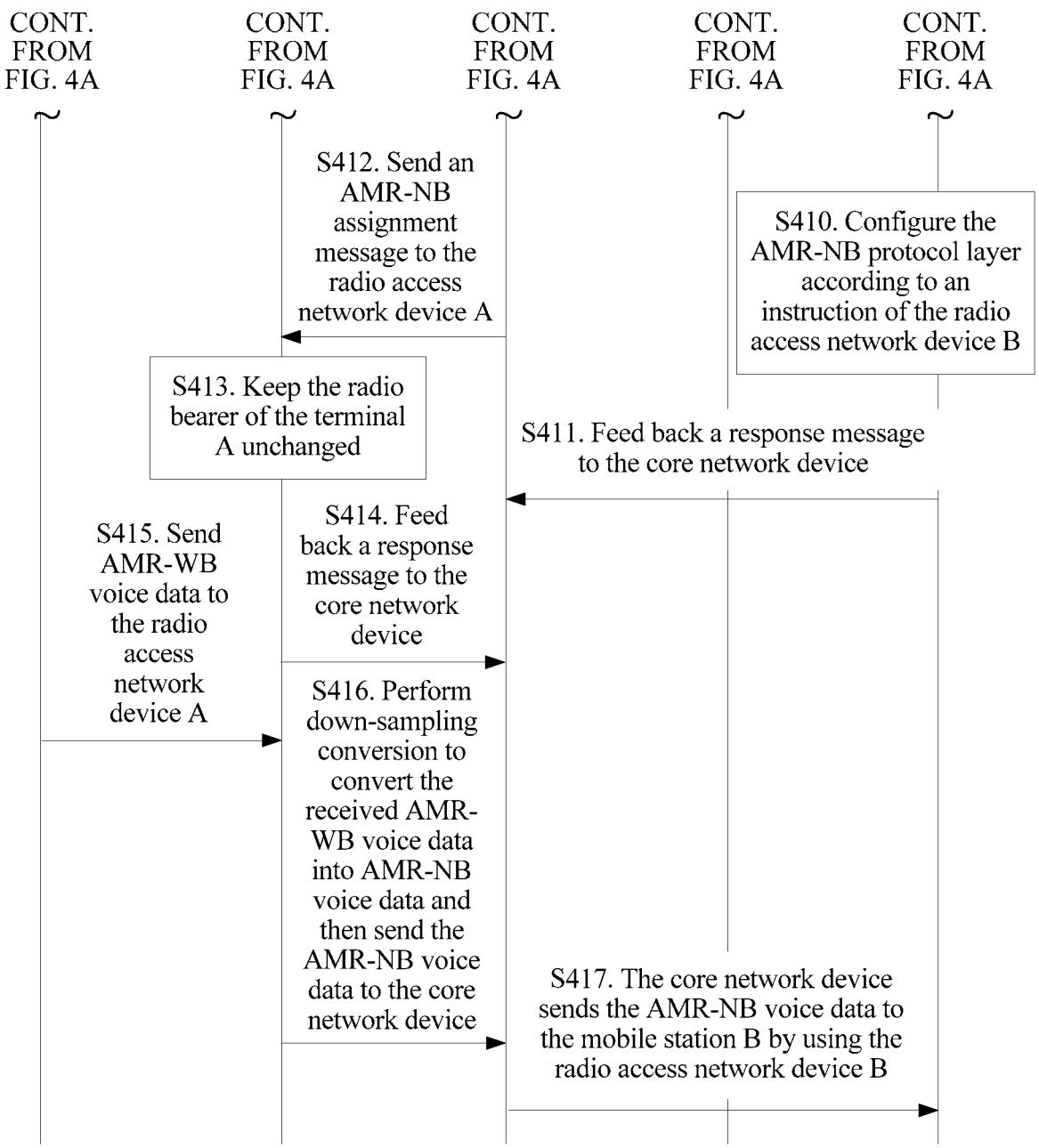

In a scenario shown in Table 3, referring to FIG. 4A and FIG. 4B, the method may include:

S401. A user performs dialing by using the terminal A to call the terminal B.

S402. The terminal A sends call setup signaling carrying an identifier of the terminal B to the core network device by using the radio access network device A.

S403. The core network device sends an AMR-WB assignment message to the radio access network device A according to the voice service codec capability of the terminal A, the voice service codec capability of the radio access network device A, and the voice service codec capability configured on the core network device itself.

The AMR-WB assignment message is used to set up a radio bearer for performing an AMR-WB voice service.

S404. The radio access network device A sets up an AMR-WB radio bearer for the terminal A and instructs the terminal A to configure an AMR-WB protocol layer.

S405. The terminal A configures the AMR-WB protocol layer according to an instruction of the radio access network device A.

S406. The terminal A feeds back a response message to the core network device.

S407. The core network device pages the terminal B according to the identifier of the terminal B.

S408. The core network device sends an AMR-NB assignment message to the radio access network device B according to the voice service codec capability of the terminal B, the capability of the radio access network device B, the voice service codec capability configured on the core network device itself, and a type of the radio bearer set up for the terminal A.

S409. The radio access network device B sets up an AMR-NB radio bearer for the terminal B and instructs the terminal B to configure an AMR-NB protocol layer.

S410. The terminal B configures the AMR-NB protocol layer according to an instruction of the radio access network device B.

S411. The terminal B feeds back a response message to the core network device.

S412. The core network device determines that service types assigned for two ends are inconsistent and sends an AMR-NB assignment message to the radio access network device A.

S413. The radio access network device A keeps the radio bearer of the terminal A unchanged.

Specifically, in S413, if the radio access network device A determines, according to the received assignment message, that at least one logical functional entity that is capable of providing only an AMR-NB voice service exists, in a link, between the radio access network A and the terminal B, and all logical functional entities, in the link, between the radio access network device A and the terminal A are capable of providing the AMR-WB voice service, the AMR-WB radio bearer of the terminal A is kept unchanged.

S414. The radio access network device A feeds back a response message to the core network device.

Setting up a voice service radio bearer is complete hereto. A process of a voice call may be performed, and the method may further include:

S415. The terminal A sends AMR-WB voice data to the radio access network device A.

S416. The radio access network device A performs down-sampling conversion to convert the received AMR-WB voice data into AMR-NB voice data and then sends the AMR-NB voice data to the core network device.

S417. The core network device sends the AMR-NB voice data to the terminal B by using the radio access network device B.

By means of S415 to S417, transmission of the voice data sent by the terminal A to the terminal B is complete.

Further, transmission of voice data sent by the terminal B to the terminal A completely reverses that from S415 to S417, and details are not described herein again.

The voice service between the terminal A and the terminal B is complete hereto.

According to the method for setting up a radio bearer provided in this embodiment of the present invention, it is determined whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing a voice service of a high voice quality codec scheme; if at least one logical functional entity that is capable of providing only the voice service of the low voice quality codec scheme exists, in the link, between the network device and the second terminal, a radio bearer used to perform the voice service of the high voice quality codec scheme is set up for the first terminal; and voice data is received and converted before sending. In this way, when at least one logical functional entity that is capable of providing only the voice service of the low voice quality codec scheme exists, in the link, between the network device and the second terminal, the radio bearer set up by the network device for the first terminal is a radio bearer for performing the voice service of the high voice quality codec scheme and is not restricted by a service capability of a logical functional entity between the network device and the second terminal. This overcomes a defect in the prior art that a type of a radio bearer for performing a voice service depends on a voice service codec capability that is the lowest in voice service codec capabilities of all communications devices. In addition, the network device converts the received voice data, so that a format of the voice data conforms to a type of a transmission channel. Therefore, the present invention implements that a user on a side of a terminal that is capable of providing a high-quality codec scheme can experience a high-definition voice service, so that user experience of the terminal is consistent with a capability of the terminal, thereby improving user experience.

Embodiment 3

Embodiment 3 of the present invention provides yet another method for setting up a radio bearer. A process of interaction between a core network device, a radio access network device, and a terminal and a voice service procedure in which a terminal A (a calling terminal) calls a terminal B (a called terminal) are used as an example to describe in detail the method for setting up a radio bearer described in Embodiment 1.

Optionally, it is assumed that a voice service codec capability of each physical network element on a network and whether an isolation and conversion function is configured (whether the method for setting up a radio bearer provided in the present invention is executed) are shown in Table 4.

TABLE 4

| Network element name | Voice service codec capability | Whether an isolation and conversion function is configured |
| --- | --- | --- |
| Terminal A | AMR-NB | Not limited |
| Radio access network A | AMR-NB | Not limited |
| Core network device | AMR-WB | Configured |
| Radio access network B | AMR-WB | Not limited |
| Terminal B | AMR-WB | Not limited |

Figure 5A:
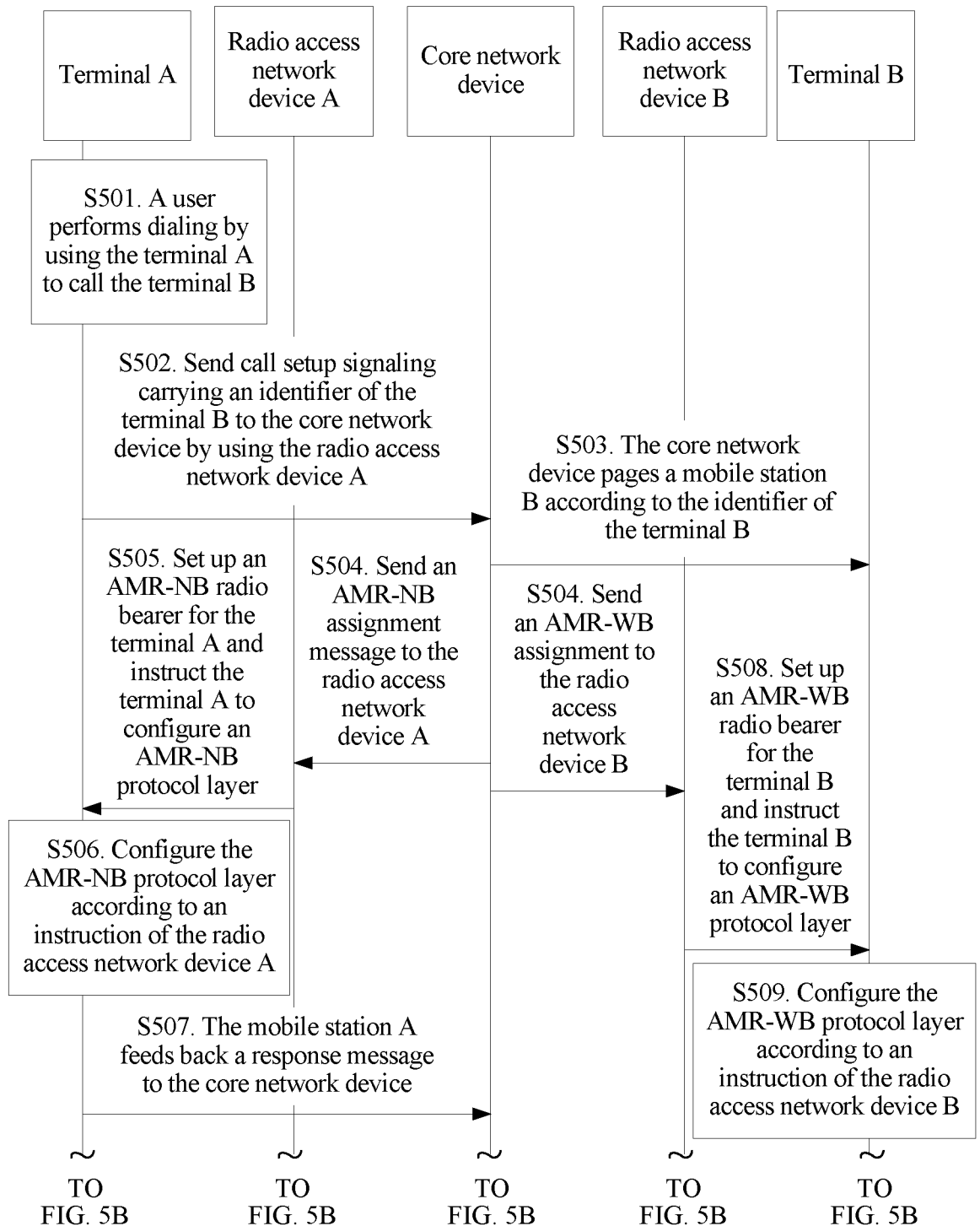
FIG. 5A and FIG. 5B are a schematic flowchart of yet another method for setting up a radio bearer according to an embodiment of the present invention.
Figure 5B:
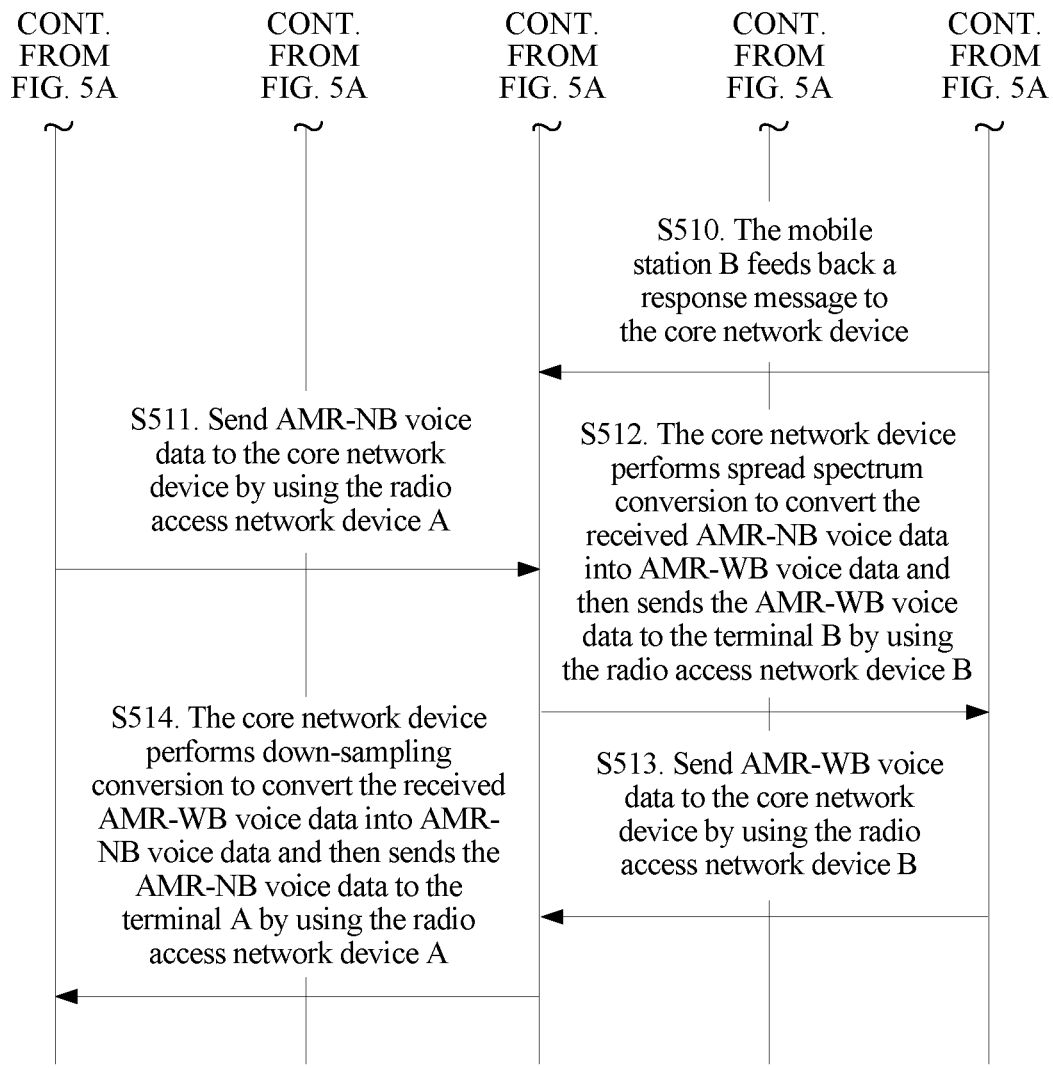

In a scenario shown in Table 4, referring to FIG. 5A and FIG. 5B, the method may include:

S501. A user performs dialing by using the terminal A to call the terminal B.

S502. The terminal A sends call setup (Call Setup) signaling carrying an identifier of the terminal B to the core network device by using the radio access network device A.

S503. The core network device pages the terminal B according to the identifier of the terminal B.

S504. The core network device sends an AMR-NB assignment message to the radio access network device A and sends an AMR-WB assignment message to the radio access network device B.

Specifically, in S503, if the core network device determines, according to a voice service codec capability of each logical functional entity, that at least one logical functional entity that is capable of providing only an AMR-NB voice service exists, in a link, between the core network device and the terminal A, and all logical functional entities, in the link, between the core network device and the terminal B are capable of providing an AMR-WB voice service, an AMR-WB radio bearer is set up for the terminal B and an AMR-NB radio bearer is set up for the terminal A.

S505. The radio access network device A sets up an AMR-NB radio bearer for the terminal A and instructs the terminal A to configure an AMR-NB protocol layer.

S506. The terminal A configures the AMR-NB protocol layer according to an instruction of the radio access network device A.

S507. The terminal A feeds back a response message to the core network device.

S508. The radio access network device B sets up an AMR-WB radio bearer for the terminal B and instructs the terminal B to configure an AMR-WB protocol layer.

S509. The terminal B configures the AMR-WB protocol layer according to an instruction of the radio access network device B.

S510. The terminal B feeds back a response message to the core network device.

Setting up a voice service radio bearer is complete hereto. A process of a voice call may be performed, and the method may further include:

S511. The terminal A sends AMR-NB voice data to the core network device by using the radio access network device A.

S512. The core network device performs spread spectrum conversion to convert the received AMR-NB voice data into AMR-WB voice data and then sends the AMR-WB voice data to the terminal B by using the radio access network device B.

S513. The terminal B sends AMR-WB voice data to the core network device by using the radio access network device B.

S514. The core network device performs down-sampling conversion to convert the received AMR-WB voice data into AMR-NB voice data and then sends the AMR-NB voice data to the terminal A by using the radio access network device A.

By means of S511 to S514, transmission of the voice data sent by the terminal A to the terminal B is complete.

The voice service between the terminal A and the terminal B is complete hereto.

Optionally, it is assumed that a voice service codec capability of each physical network element on a network and whether an isolation and conversion function is configured are shown in Table 5.

TABLE 5

| Network element name | Voice service codec capability | Whether an isolation and conversion function is configured |
| --- | --- | --- |
| Terminal A | AMR-WB | Not limited |
| Radio access network A | AMR-WB | Not limited |
| Core network device | AMR-WB | Configured |
| Radio access network B | AMR-NB | Not limited |
| Terminal B | AMR-NB | Not limited |

In a scenario shown in Table 5, a process of performing a voice service between the terminal A and the terminal B is similar to that from S501 to S514. The only difference is that AMR-WB is on the side of the terminal A, and that AMR-NB is on the side of the terminal B, and details are not described herein again.

According to the method for setting up a radio bearer provided in this embodiment of the present invention, it is determined whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing a voice service of a high voice quality codec scheme; if at least one logical functional entity that is capable of providing only the voice service of the low voice quality codec scheme exists, in the link, between the network device and the second terminal, a radio bearer used to perform the voice service of the high voice quality codec scheme is set up for the first terminal; and voice data is received and converted before sending. In this way, when at least one logical functional entity that is capable of providing only the voice service of the low voice quality codec scheme exists, in the link, between the network device and the second terminal, the radio bearer set up by the network device for the first terminal is a radio bearer for performing the voice service of the high voice quality codec scheme and is not restricted by a service capability of a logical functional entity between the network device and the second terminal. This overcomes a defect in the prior art that a type of a radio bearer for performing a voice service depends on a voice service codec capability that is the lowest in voice service codec capabilities of all communications devices. In addition, the network device converts the received voice data, so that a format of the voice data conforms to a type of a transmission channel. Therefore, the present invention implements that a user on a side of a terminal that is capable of providing the voice service of a high-quality codec scheme can experience a high-definition voice service, so that user experience of the terminal is consistent with a capability of the terminal, thereby improving user experience.

Embodiment 4

Embodiment 4 of the present invention provides yet another method for setting up a radio bearer. A process of interaction between a core network device, a radio access network device, and a terminal and a voice service procedure in which a terminal A (a calling terminal) calls a terminal B (a called terminal) are used as an example to describe in detail the method for setting up a connection and a radio bearer described in the foregoing embodiments.

Optionally, it is assumed that a voice service codec capability of each physical network element on a network and whether an isolation and conversion function is configured (whether the method for setting up a radio bearer provided in the present invention is executed) are shown in Table 6 or Table 7.

TABLE 6

| Network element name | Voice service codec capability | Whether an isolation and conversion function is configured |
|---|---|---|
| Terminal A | AMR-WB | Configured |
| Radio access network A | AMR-NB | Not limited |
| Core network device | AMR-WB | Not configured |
| Radio access network B | AMR-NB | Not limited |
| Terminal B | AMR-NB or AMR-WB | Not limited |
| | AMR-NB | Not limited |

TABLE 7

| Network element name | Voice service codec capability | Whether an isolation and conversion function is configured |
|---|---|---|
| Terminal A | AMR-WB | Configured |
| Radio access network A | AMR-NB | Not limited |
| Core network device | AMR-WB | Not limited |
| Radio access network B | AMR-NB or AMR-WB | Not limited |
| Terminal B | AMR-NB | Not limited |

Figure 6:
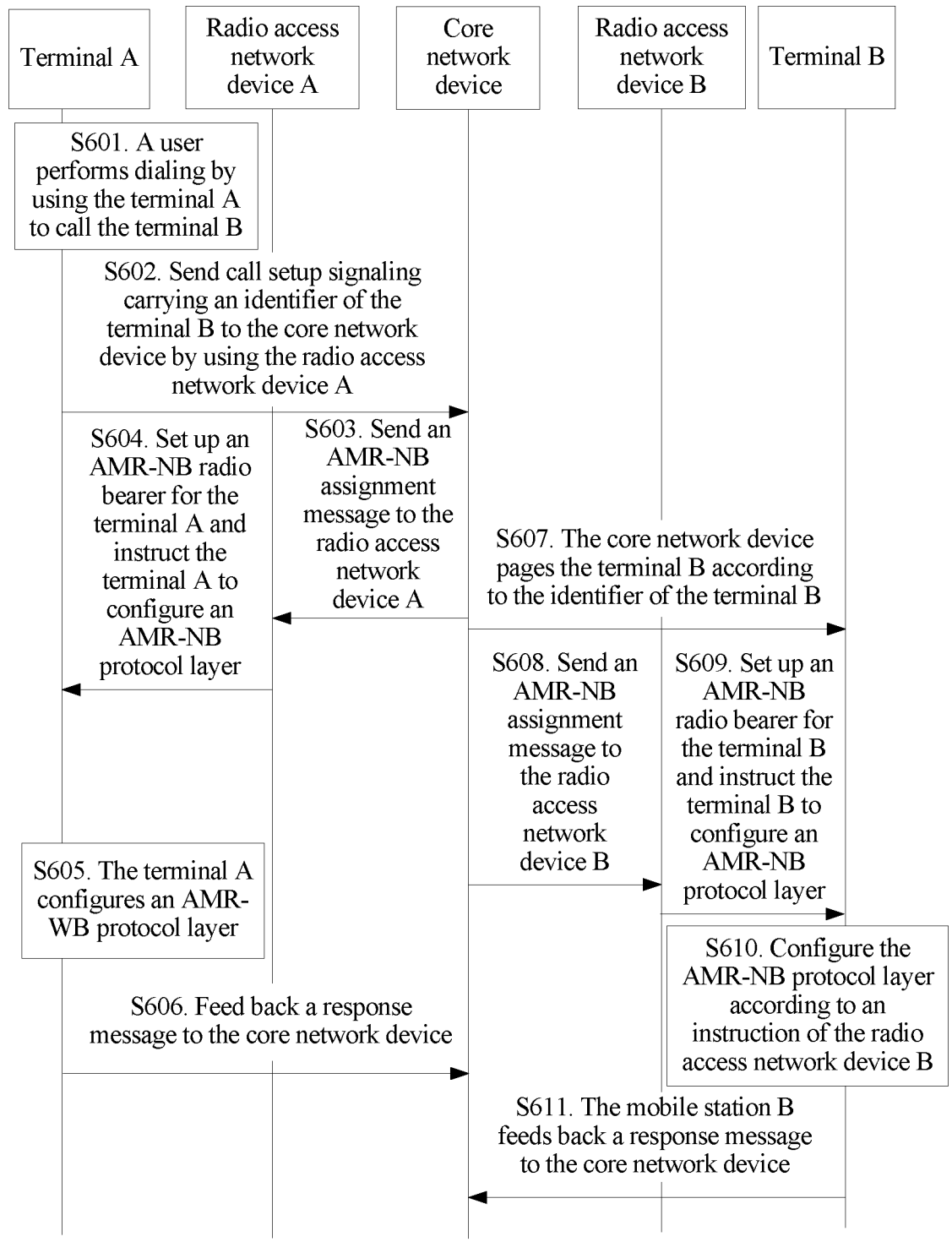
FIG. 6 is a schematic flowchart of yet another method for setting up a radio bearer according to an embodiment of the present invention.

In a scenario shown in Table 6 or Table 7, referring to FIG. 6, the method may include:

S601. A user performs dialing by using the terminal A to call the terminal B.

S602. The terminal A sends call setup signaling carrying an identifier of the terminal B to the core network device by using the radio access network device A.

S603. The core network device sends an AMR-NB assignment message to the radio access network device A according to the voice service codec capability of the terminal A, the voice service codec capability of the radio access network device A, and the voice service codec capability configured on the core network device itself.

S604. The radio access network device A sets up an AMR-NB radio bearer for the terminal A and instructs the terminal A to configure an AMR-NB protocol layer.

S605. The terminal A configures an AMR-WB protocol layer.

Specifically, in S605, if the terminal A determines, according to an instruction of the radio access network device, that at least one logical functional entity that is capable of providing only an AMR-NB voice service exists, in a link, between the terminal A and the terminal B, and all logical functional entities, in the link, between a network device (the terminal A) and the terminal A are capable of providing an AMR-WB voice service, an AMR-WB radio bearer is set up for the terminal A, that is, the terminal A configures the AMR-WB protocol layer.

S606. The terminal A feeds back a response message to the core network device.

S607. The core network device pages a mobile station B according to an identifier of the mobile station B.

S608. The core network device sends an AMR-NB assignment message to the radio access network device B according to the voice service codec capability of the terminal B, the capability of the radio access network device B, the voice service codec capability configured on the core network device itself, and a type of the radio bearer set up for the terminal A.

S609. The radio access network device B sets up an AMR-NB radio bearer for the terminal B and instructs the terminal B to configure an AMR-NB protocol layer.

S610. The terminal B configures the AMR-NB protocol layer according to an instruction of the radio access network device B.

S611. The terminal B feeds back a response message to the core network device.

Setting up a voice service radio bearer is complete hereto. A process of a voice call may be performed. The process of the voice call is described in detail in the foregoing embodiments, and details are not described herein again.

Optionally, it is assumed that a voice service codec capability of each physical network element on a network and whether an isolation and conversion function is configured are shown in Table 8 or Table 9.

TABLE 8

| Network element name | Voice service codec capability | Whether an isolation and conversion function is configured |
|---|---|---|
| Terminal A | AMR-NB | Not limited |
| Radio access network A | AMR-NB or AMR-WB | Not limited |
| Core network device | AMR-NB | Not limited |
| Radio access network B | AMR-NB | Not limited |
| | AMR-WB | Not configured |
| Terminal B | AMR-WB | Configured |

TABLE 9

| Network element name | Voice service codec capability | Whether an isolation and conversion function is configured |
|---|---|---|
| Terminal A | AMR-NB | Not limited |
| Radio access network A | AMR-NB or AMR-WB | Not limited |
| Core network device | AMR-WB | Not limited |
| Radio access network B | AMR-NB | Not limited |
| Terminal B | AMR-WB | Configured |

In a scenario shown in Table 8 or Table 9, a process of performing a voice service between the terminal A and the terminal B is similar to that from S601 to S611. The only difference is that AMR-NB is on the side of the terminal A, and that AMR-WB is on the side of the terminal B, and details are not described herein again.

Optionally, it is assumed that a voice service codec capability of each physical network element on a network and whether an isolation and conversion function is configured are shown in Table 10.

TABLE 10

| Network element name | Voice service codec capability | Whether an isolation and conversion function is configured |
| --- | --- | --- |
| Terminal A | AMR-WB | Configured |
| Radio access network device A | AMR-WB | Not configured |
| Core network device | AMR-WB | Not configured |
| Radio access network B | AMR-NB or AMR-WB | Not limited |
| Terminal B | AMR-NB | Not limited |

Figure 7:
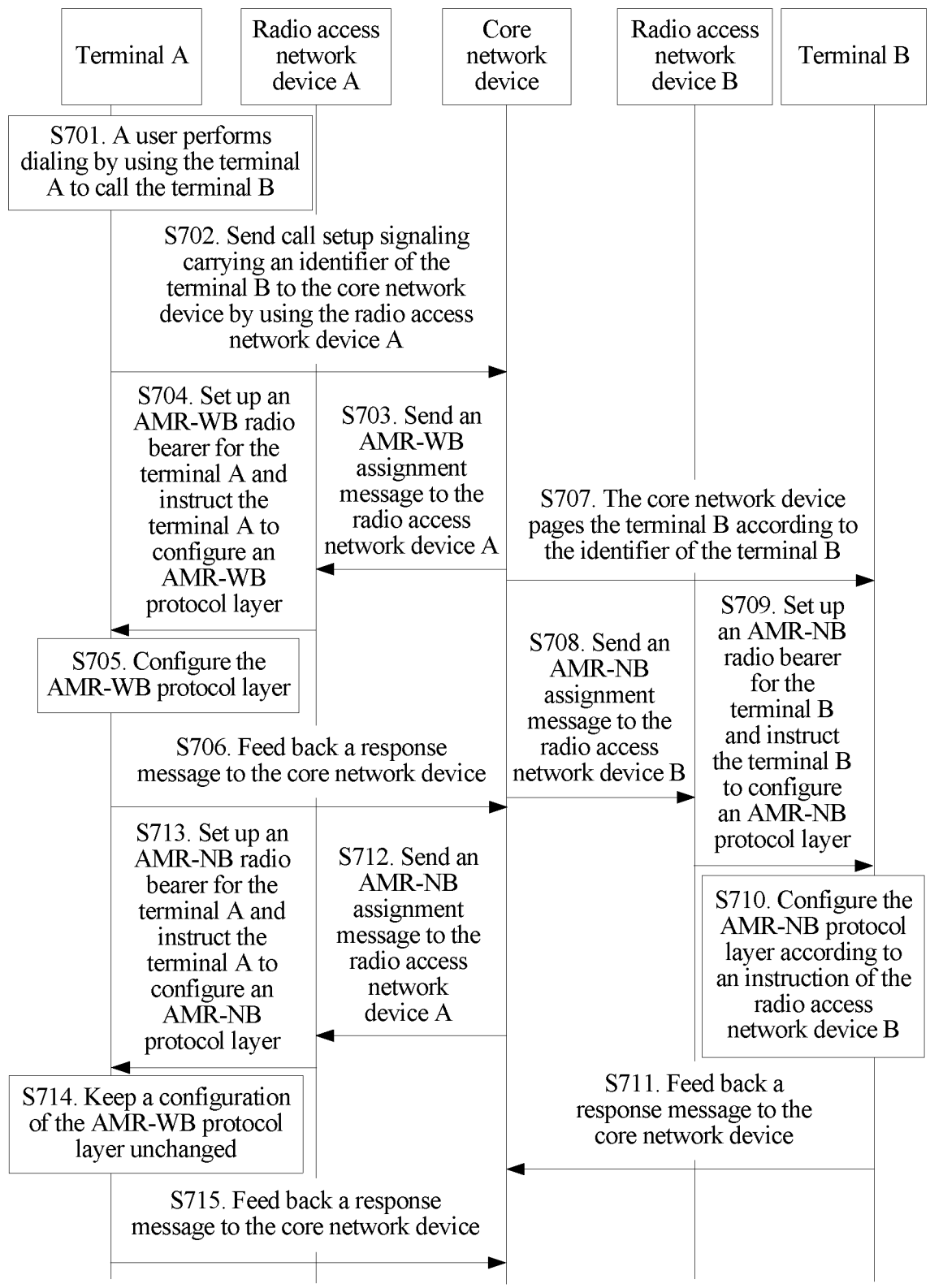
FIG. 7 is a schematic flowchart of yet another method for setting up a radio bearer according to an embodiment of the present invention.

In a scenario shown in Table 10, referring to FIG. 7, the method may include:

S701. A user performs dialing by using the terminal A to call the terminal B.

S702. The terminal A sends call setup (Call Setup) signaling carrying an identifier of the terminal B to the core network device by using the radio access network device A.

S703. The core network device sends an AMR-WB assignment message to the radio access network device A according to the voice service codec capability of the terminal A, the voice service codec capability of the radio access network device A, and the voice service codec capability configured on the core network device itself.

S704. The radio access network device A sets up an AMR-WB radio bearer for the terminal A and instructs the terminal A to configure an AMR-WB protocol layer.

S705. The terminal A configures the AMR-WB protocol layer according to an instruction of the radio access network device A.

S706. The terminal A feeds back a response message to the core network device.

S707. The core network device pages the terminal B according to the identifier of the terminal B.

S708. The core network device sends an AMR-NB assignment message to the radio access network device B according to the voice service codec capability of the terminal B, the capability of the radio access network device B, the voice service codec capability configured on the core network device itself, and a type of the radio bearer set up for the terminal A.

S709. The radio access network device B sets up an AMR-NB radio bearer for the terminal B and instructs the terminal B to configure an AMR-NB protocol layer.

S710. The terminal B configures the AMR-NB protocol layer according to an instruction of the radio access network device B.

S711. The terminal B feeds back a response message to the core network device.

S712. The core network device determines that service types assigned for two ends are inconsistent and sends an AMR-NB assignment message to the radio access network device A.

S713. The radio access network device A sets up, for the terminal A, a radio bearer of an AMR-NB voice service and instructs the terminal A to configure an AMR-NB protocol layer.

S714. The terminal A keeps a configuration of the AMR-WB protocol layer unchanged.

Specifically, in S714, if the terminal A determines, according to an instruction of the radio access network device, that at least one logical functional entity that is capable of providing only the AMR-NB voice service exists, in a link, between the terminal A and the terminal B, and all logical functional entities, in the link, between a network device (the terminal A) and the terminal A are capable of providing an AMR-WB voice service, the AMR-WB radio bearer is set up for the terminal A, that is, the terminal A keeps the configuration of the AMR-WB protocol layer unchanged.

S715. The terminal A feeds back a response message to the core network device.

Setting up a voice service radio bearer is complete hereto. A process of a voice call may be performed.

According to the method for setting up a radio bearer provided in this embodiment of the present invention, it is determined whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing a voice service of a high voice quality codec scheme; if a voice service codec capability of at least one logical functional entity that is capable of providing only the voice service of the low voice quality codec scheme exists, in the link, between the network device and the second terminal, a radio bearer used to perform the voice service of the high voice quality codec scheme is set up for the first terminal; and voice data is received and converted before sending. In this way, when at least one logical functional entity that is capable of providing only the voice service of the low voice quality codec scheme exists, in the link, between the network device and the second terminal, the radio bearer set up by the network device for the first terminal is a radio bearer for performing the voice service of the high voice quality codec scheme and is not restricted by a service capability of a logical functional entity between the network device and the second terminal. This overcomes a defect in the prior art that a type of a radio bearer for performing a voice service depends on a voice service codec capability that is the lowest in voice service codec capabilities of all communications devices. In addition, the network device converts the received voice data, so that a format of the voice data conforms to a type of a transmission channel. Therefore, the present invention implements that a user on a side of a terminal that is capable of providing the voice service of a high-quality codec scheme can experience a high-definition voice service, so that user experience of the terminal is consistent with a capability of the terminal, thereby improving user experience.

Embodiment 5

Figure 8:
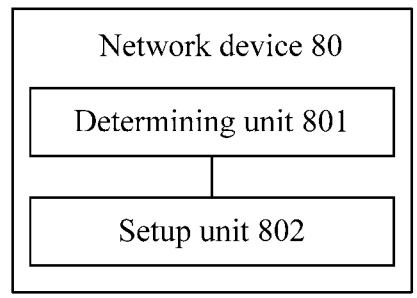
FIG. 8 is a schematic structural diagram of a network device according to an embodiment of the present invention.

Embodiment 5 of the present invention provides a network device 80, where the network device 80 is capable of providing a voice service of a high voice quality codec scheme. Referring to FIG. 8, the network device 80 may include:

a determining unit 801, configured to determine whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing the voice service of the high voice quality codec scheme; and a setup unit 802, configured to: if at least one logical functional entity that is capable of providing only the voice service of the low voice quality codec scheme exists, in the link, between the network device and the second terminal, set up, for the first terminal, a radio bearer used to perform the voice service of the high voice quality codec scheme.

Figure 9:
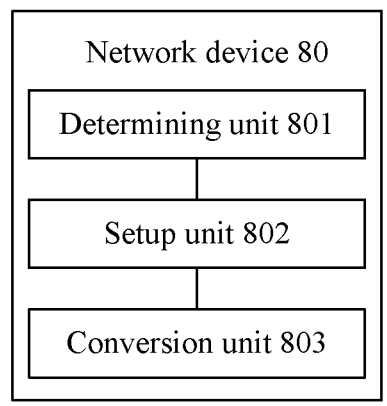
FIG. 9 is a schematic structural diagram of another network device according to an embodiment of the present invention.

Further, referring to FIG. 9, the network device 80 may further include a conversion unit 803, configured to:

receive voice data of the high voice quality codec scheme, and perform down-sampling conversion to convert the voice data of the high voice quality codec scheme into voice data of the low voice quality codec scheme before sending;

or, receive voice data of the low voice quality codec scheme, and perform spread spectrum conversion to convert the voice data of the low voice quality codec scheme into voice data of the high voice quality codec scheme before sending.

Specifically, the setup unit 802 may be further configured to:

if no radio bearer has been set up for the first terminal, set up, for the first terminal, a new radio bearer used to perform the voice service of the high voice quality codec scheme; or if a radio bearer used to perform the voice service of the high voice quality codec scheme has been set up for the first terminal, keep the radio bearer of the first terminal unchanged.

Optionally, the network device 80 may be a radio access network device, and the determining unit 801 may be further configured to:

receive an assignment message that is sent by a core network device and that is used to set up a voice service radio bearer.

If the assignment message instructs to set up a radio bearer of the low voice quality codec scheme, at least one logical functional entity that is capable of providing only the voice service of the low voice quality codec scheme exists, in the link, between the network device and the second terminal.

Correspondingly, the setup unit 802 may be further configured to:

set up, for the first terminal, the radio bearer used to perform the voice service of the high voice quality codec scheme, and send an instruction message to the first terminal, where the instruction message is used to instruct the first terminal to configure a protocol layer for high voice quality.

Optionally, the network device 80 may be the first terminal, and the determining unit 801 may be further configured to:

receive an instruction message sent by a radio access network device for configuring a protocol layer.

If the instruction message instructs to configure a protocol layer for low voice quality, at least one logical functional entity that is capable of providing only the voice service of the low voice quality codec scheme exists, in the link, between the network device and the second terminal.

Correspondingly, the setup unit 802 may be further configured to:

configure a protocol layer for high voice quality.

Optionally, the network device 80 may be a core network device, and the setup unit 802 may be further configured to:

send, to a radio access network device that provides a service to the first terminal, an assignment message used to set up the radio bearer of the voice service of the high voice quality codec scheme.

Further, the setup unit 802 may be further configured to:

send, to a radio access network device that provides a service to the second terminal, an assignment message used to set up a radio bearer of the voice service of the low voice quality codec scheme.

The codec scheme includes AMR-NB, AMR-WB, EVS-NB, EVS-WB, EVS-SWB, and EVS-FB.

Optionally, if the high voice quality codec scheme is EVS-FB, the low voice quality codec scheme is EVS-SWB, EVS-WB, EVS-NB, AMR-WB, or AMR-NB.

Optionally, if the high voice quality codec scheme is the EVS SWB, the low voice quality codec scheme is EVS-WB, EVS-NB, AMR-WB, or AMR-NB.

Optionally, if the high voice quality codec scheme is EVS-WB, the low voice quality codec scheme is EVS-NB, AMR-WB, or AMR-NB.

Optionally, if the high voice quality codec scheme is EVS-NB, the low voice quality codec scheme is AMR-WB or AMR-NB.

Optionally, if the high voice quality codec scheme is AMR-WB, the low voice quality codec scheme is AMR-NB.

According to the network device 80 provided in this embodiment of the present invention, it is determined whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing a voice service of a high voice quality codec scheme; and if at least one logical functional entity that is capable of providing only the voice service of the low voice quality codec scheme exists, in the link, between the network device and the second terminal, a radio bearer used to perform the voice service of the high voice quality codec scheme is set up for the first terminal. In this way, when at least one logical functional entity that is capable of providing only the voice service of the low voice quality codec scheme exists, in the link, between the network device and the second terminal, the radio bearer set up by the network device for the first terminal is a radio bearer for performing the voice service of the high voice quality codec scheme and is not restricted by a service capability of a logical functional entity between the network device and the second terminal. This overcomes a defect in the prior art that a type of a radio bearer for performing a voice service depends on a voice service codec capability that is the lowest in voice service codec capabilities of all communications devices. Therefore, the present invention implements that a user on a side of a terminal that is capable of providing the voice service of a high-quality codec scheme can experience a high-definition voice service, so that user experience of the terminal is consistent with a capability of the terminal, thereby improving user experience.

Embodiment 6

Figure 10:
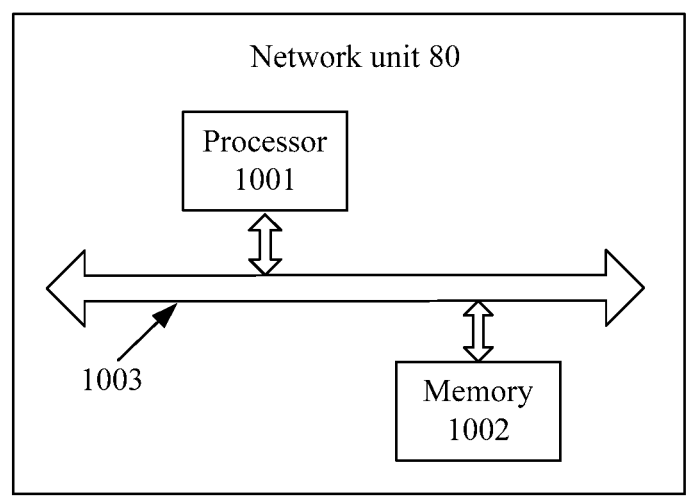
FIG. 10 is a schematic structural diagram of still another network device according to an embodiment of the present invention.

Embodiment 6 of the present invention provides another network device 80, where the network device 80 is capable of providing a voice service of a high voice quality codec scheme. Referring to FIG. 10, the network device 80 may include:

at least one processor 1001, a memory 1002, and at least one communications bus 1003 configured to implement a connection and mutual communication between apparatuses.

The communications bus 1003 may be an industry standard architecture (Industry Standard Architecture, ISA for short) bus, a peripheral component interconnect (PCI for short) bus, an Extended Industry Standard Architecture (EISA for short) bus, or the like. The communications bus 1003 may be classified into an address bus, a data bus, a control bus, and the like and for ease of denotation, is represented by using one thick line in FIG. 10; however, it does not indicate that there is only one bus or only one type of bus.

The processor 1001 may be a central processing unit (CPU for short), or an application-specific integrated circuit (ASIC for short), or be configured as one or more integrated circuits implementing the embodiments of the present invention. The processor 1001 is configured to execute program code stored in the memory 1002, so as to implement a function of the processor 1001.

The processor 1001 is configured to determine whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing the voice service of the high voice quality codec scheme.

The processor 1001 is further configured to: if at least one logical functional entity that is capable of providing only the voice service of the low voice quality codec scheme exists, in the link, between the network device and the second terminal, set up, for the first terminal, a radio bearer used to perform the voice service of the high voice quality codec scheme.

Figure 11:
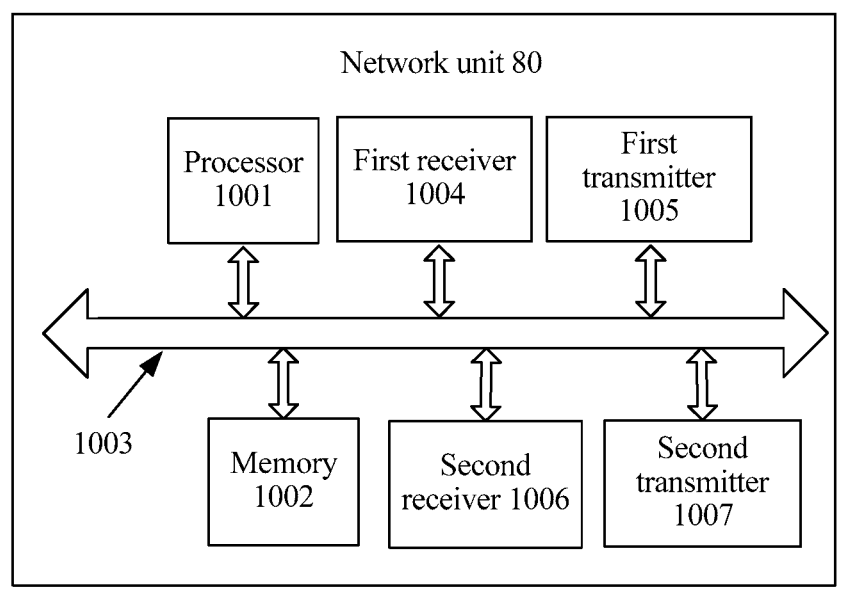
FIG. 11 is a schematic structural diagram of yet another network device according to an embodiment of the present invention.

Further, referring to FIG. 11, the network device 80 may further include:

a first receiver 1004, configured to receive voice data; and a first transmitter 1005, configured to send voice data.

Optionally, the first receiver 1004 may receive voice data of the high voice quality codec scheme. The processor 1001 performs down-sampling conversion to convert the voice data of the high voice quality codec scheme received by the first receiver 1004 into voice data of the low voice quality codec scheme. The first transmitter 1005 sends the voice data of the low voice quality codec scheme obtained by means of the conversion by the processor 1001;

or, optionally, the first receiver 1004 may receive voice data of the low voice quality codec scheme. The processor 1001 performs spread spectrum conversion to convert the voice data of the low voice quality codec scheme received by the first receiver 1004 into voice data of the high voice quality codec scheme. The first transmitter 1005 sends the voice data of the high voice quality codec scheme obtained by means of the conversion by the processor 1001.

Specifically, the processor 1001 may be further configured to:

if no radio bearer has been set up for the first terminal, set up, for the first terminal, a new radio bearer used to perform the voice service of the high voice quality codec scheme; or if a radio bearer used to perform the voice service of the high voice quality codec scheme has been set up for the first terminal, keep the radio bearer of the first terminal unchanged.

Further, referring to FIG. 11, the network device 80 may further include: a second receiver 1006, configured to receive a control-plane message; and a second transmitter 1007, configured to send a control-plane message.

Optionally, the network device 80 is the radio access network device, and the processor 1001 may be further configured to:

receive, by using the second receiver 1006, an assignment message that is sent by a core network device and that is used to set up a voice service radio bearer.

If the assignment message instructs to set up a radio bearer of the low voice quality codec scheme, at least one logical functional entity that is capable of providing only the voice service of the low voice quality codec scheme exists, in the link, between the network device and the second terminal.

Correspondingly, if the network device 80 is a core network device, the processor 1001 is configured to:

set up, for the first terminal, the radio bearer used to perform the voice service of the high voice quality codec scheme, and send, by using the second transmitter 1007, an instruction message to the first terminal, where the instruction message is used to instruct the first terminal to configure a protocol layer for high voice quality.

Optionally, the network device 80 is the first terminal, and the processor 1001 may be further configured to:

receive, by using the second receiver 1006, an instruction message sent by a radio access network device for configuring a protocol layer.

If the instruction message instructs to configure a protocol layer for low voice quality, at least one logical functional entity that is capable of providing only the voice service of the low voice quality codec scheme exists, in the link, between the network device and the second terminal.

Correspondingly, the processor 1001 may further be further configured to:

configure a protocol layer for high voice quality.

Optionally, the network device 80 is a core network device, and the processor 1001 may be further configured to:

send, by using the second transmitter 1007 to a radio access network device that provides a service to the first terminal, an assignment message used to set up the radio bearer of the voice service of the high voice quality codec scheme.

Further, the processor 1001 may be further configured to:

send, by using the second transmitter 1007 to a radio access network device that provides a service to the second terminal, an assignment message used to set up a radio bearer of the voice service of the low voice quality codec scheme.

Further, the codec scheme includes AMR-NB, AMR-WB, EVS-NB, EVS-WB, EVS-SWB, and EVS-FB.

Optionally, if the high voice quality codec scheme is EVS-FB, the low voice quality codec scheme is EVS-SWB, EVS-WB, EVS-NB, AMR-WB, or AMR-NB.

Optionally, if the high voice quality codec scheme is the EVS SWB, the low voice quality codec scheme is EVS-WB, EVS-NB, AMR-WB, or AMR-NB.

Optionally, if the high voice quality codec scheme is EVS-WB, the low voice quality codec scheme is EVS-NB, AMR-WB, or AMR-NB.

Optionally, if the high voice quality codec scheme is EVS-NB, the low voice quality codec scheme is AMR-WB or AMR-NB.

Optionally, if the high voice quality codec scheme is AMR-WB, the low voice quality codec scheme is AMR-NB.

According to the network device 80 provided in this embodiment of the present invention, it is determined whether, in an end-to-end link in which a voice service is performed between a first terminal and a second terminal, at least one logical functional entity that is capable of providing only a voice service of a low voice quality codec scheme exists between the network device and the second terminal, where all logical functional entities, in the link, between the network device and the first terminal are capable of providing a voice service of a high voice quality codec scheme; and if at least one logical functional entity that is capable of providing only the voice service of the low voice quality codec scheme exists, in the link, between the network device and the second terminal, a radio bearer used to perform the voice service of the high voice quality codec scheme is set up for the first terminal. In this way, when at least one logical functional entity that is capable of providing only the voice service of the low voice quality codec scheme exists, in the link, between the network device and the second terminal, the radio bearer set up by the network device for the first terminal is a radio bearer for performing the voice service of the high voice quality codec scheme and is not restricted by a service capability of a logical functional entity between the network device and the second terminal. This overcomes a defect in the prior art that a type of a radio bearer for performing a voice service depends on a voice service codec capability that is the lowest in voice service codec capabilities of all communications devices. Therefore, the present invention implements that a user on a side of a terminal that is capable of providing the voice service of a high-quality codec scheme can experience a high-definition voice service, so that user experience of the terminal is consistent with a capability of the terminal, thereby improving user experience.

In addition, a computer readable medium (or medium) is further provided, including computer readable instructions that, when being executed, are used to perform the following operations: the operations of the methods in the foregoing Embodiment 1 to Embodiment 4 are executed.

In addition, a computer program product is further provided, including the foregoing computer readable medium.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not executed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, and may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to execute some of the steps of the methods described in the embodiments of the present invention. The foregoing storage medium includes: any medium that can store program code, such as a USB flash drive, a portable hard drive, a read-only memory (Read-Only Memory, ROM), a random access memory (Random Access Memory, RAM), a magnetic disk, or an optical disc.

Finally, it should be noted that the foregoing embodiments are merely intended to describe the technical solutions of the present invention but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for setting up a call between two terminals including a first terminal and a second terminals, the call being set up in an end-to-end link in which a voice service is provided, the method comprising:
   determining whether at least one logical functional entity capable of providing only the voice service in a low voice quality codec scheme exists between a network device and the second terminal, wherein all logical functional entities, in the end-to-end link, between the network device and the first terminal are capable of providing the voice service in a high voice quality codec scheme; and
   when it is determined that the at least one logical functional entity capable of providing only the voice service in the low voice quality codec scheme exists between the network device and the second terminal, setting up, for the first terminal, a radio bearer to provide the voice service in the high voice quality codec scheme, wherein the at least one logical functional entity capable of providing only the voice service in a low voice quality codec scheme provides the voice service in the low voice quality codec scheme.

2. The method according to claim 1, after setting up, for the first terminal, the radio bearer, comprising:
   receiving voice data of the high voice quality codec scheme; and
   performing down-sampling conversion to convert the voice data of the high voice quality codec scheme into voice data of the low voice quality codec scheme before sending;
   or,
   receiving voice data of the low voice quality codec scheme; and
   performing spread spectrum conversion to convert the voice data of the low voice quality codec scheme into voice data of the high voice quality codec scheme before sending.

3. The method according to claim 1, wherein setting up, for the first terminal, the radio bearer comprises:
when no radio bearer has been set up for the first terminal, setting up, for the first terminal, a new radio bearer used to perform the voice service of the high voice quality codec scheme; or
when the radio bearer used to perform the voice service of the high voice quality codec scheme has been set up for the first terminal, keeping the radio bearer of the first terminal unchanged.

4. The method according to claim 1, wherein the network device is a radio access network device;
determining whether the at least one logical functional entity that is capable of providing only a voice service of a low voice quality codec scheme exists between the network device and the second terminal comprises:
receiving an assignment message that is sent by a core network device and that is used to set up a voice service radio bearer, wherein
when the assignment message instructs to set up a radio bearer of the voice service of the low voice quality codec scheme, at least one logical functional entity that is capable of providing only the voice service of the low voice quality codec scheme exists, in the end-to-end link, between the network device and the second terminal; and
setting up, for the first terminal, the radio bearer used to perform the voice service of the high voice quality codec scheme comprises:
setting up, for the first terminal, the radio bearer used to perform the voice service of the high voice quality codec scheme, and sending an instruction message to the first terminal, wherein the instruction message instructs the first terminal to configure a protocol layer for high voice quality.

5. The method according to claim 1, wherein the network device is the first terminal;
determining whether the at least one logical functional entity that is capable of providing only a voice service of a low voice quality codec scheme exists between the network device and the second terminal comprises:
receiving an instruction message sent by a radio access network device for configuring a protocol layer, wherein
when the instruction message instructs to configure a protocol layer for low voice quality, at least one logical functional entity that is capable of providing only the voice service of the low voice quality codec scheme exists, in the end-to-end link, between the network device and the second terminal; and
setting up, for the first terminal, the radio bearer used to perform the voice service of the high voice quality codec scheme comprises:
configuring a protocol layer for high voice quality.

6. The method according to claim 1, wherein the network device is a core network device, and setting up, for the first terminal, the radio bearer used to perform the voice service of the high voice quality codec scheme comprises:
sending, to a radio access network device that provides a service to the first terminal, an assignment message used to set up the radio bearer of the voice service of the high voice quality codec scheme.

7. The method according to claim 6, after setting up, for the first terminal, the radio bearer used to perform the voice service of the high voice quality codec scheme, further comprising:
sending, to a radio access network device that provides a service to the second terminal, an assignment message used to set up a radio bearer of the voice service of the low voice quality codec scheme.

8. The method according to claim 1, wherein:
when the high voice quality codec scheme is an enhanced voice services narrowband codec (EVS-FB) scheme, the low voice quality codec scheme is an enhanced voice services super wideband codec (EVS-SWB) scheme, an enhanced voice services wideband codec (EVS-WB) scheme, an enhanced voice services narrowband codec (EVS-NB) scheme, an adaptive multi-rate wideband codec (AMR-WB) scheme, or an adaptive multi-rate narrowband codec (AMR-NB) scheme;
when the high voice quality codec scheme is an enhanced voice services super wideband codec (EVS-SWB) scheme, the low voice quality codec scheme is an enhanced voice services wideband codec (EVS-WB) scheme, an enhanced voice services narrowband codec (EVS-NB) scheme, an adaptive multi-rate wideband codec (AMR-WB) scheme, or an adaptive multi-rate narrowband codec (AMR-NB) scheme;
when the high voice quality codec scheme is an adaptive multi-rate wideband codec (AMR-WB) scheme, the low voice quality codec scheme is an enhanced voice services narrowband codec (EVS-NB) scheme, an adaptive multi-rate wideband codec (AMR-WB) scheme, or an adaptive multi-rate narrowband codec (AMR-NB) scheme;
when the high voice quality codec scheme is an enhanced voice services narrowband codec (EVS-NB) scheme, the low voice quality codec scheme is an adaptive multi-rate wideband codec (AMR-WB) scheme or an adaptive multi-rate narrowband codec (AMR-NB) scheme; and
when the high voice quality codec scheme is an adaptive multi-rate narrowband codec (AMR-NB) scheme, the low voice quality codec scheme is an adaptive multi-rate narrowband codec (AMR-NB) scheme.

9. A network device, comprising:
a processor configured to:
determine whether, in an end-to-end link in which a voice service is performed between a first terminal and a second terminal, at least one logical functional entity that is capable of providing only a voice service of a low voice quality codec scheme exists between the network device and the second terminal, wherein all logical functional entities, in the end-to-end link, between the network device and the first terminal are capable of providing the voice service of the high voice quality codec scheme; and
when at least one logical functional entity that is capable of providing only the voice service of the low voice quality codec scheme exists, in the end-to-end link, between the network device and the second terminal, set up, for the first terminal, a radio bearer used to perform the voice service of the high voice quality codec scheme, wherein the at least one logical functional entity capable of providing only the voice service in a low voice quality codec scheme provides the voice service in the low voice quality codec scheme.

10. The network device according to claim 9, further comprising:
a first receiver configured to receive voice data; wherein
the processor is further configured to perform down-sampling conversion or spread spectrum conversion on the voice data received by the first receiver; and a first transmitter configured to send the down-sampled voice data.

11. The network device according to claim 9, wherein the processor is further configured to:
when no radio bearer has been set up for the first terminal, set up, for the first terminal, a new radio bearer used to perform the voice service of the high voice quality codec scheme; or
when the radio bearer used to perform the voice service of the high voice quality codec scheme has been set up for the first terminal, keep the radio bearer of the first terminal unchanged.

12. The network device according to claim 9, wherein the network device is a radio access network device;
the network device further comprises: a second receiver configured to receive a control-plane message; and a second transmitter configured to send the control-plane message;
the processor is further configured to:
receive, by using the second receiver, an assignment message that is sent by a core network device and that is used to set up a voice service radio bearer, wherein
when the assignment message instructs to set up a radio bearer of the low voice quality codec scheme, at least one logical functional entity that is capable of providing only the voice service of the low voice quality codec scheme exists, in the end-to-end link, between the network device and the second terminal; and
set up, for the first terminal, the radio bearer used to perform the voice service of the high voice quality codec scheme, and send, by using the second transmitter, an instruction message to the first terminal, where the instruction message is used to instruct the first terminal to configure a protocol layer for high voice quality.

13. The network device according to claim 9, wherein the network device is the first terminal;
the network device further comprises: a second receiver configured to receive a control-plane message;
the processor is further configured to:
receive, by using the second receiver, an instruction message sent by a radio access network device for configuring a protocol layer, wherein
when the instruction message instructs to configure a protocol layer for low voice quality, at least one logical functional entity that is capable of providing only the voice service of the low voice quality codec scheme exists, in the end-to-end link, between the network device and the second terminal; and
configure a protocol layer for high voice quality.

14. The network device according to claim 9, wherein the network device is a core network device,
the network device further comprises: a second transmitter configured to send a control-plane message; and
the processor is further configured to send, by using the second transmitter to a radio access network device that provides a service to the first terminal, an assignment message used to set up the radio bearer of the voice service of the high voice quality codec scheme.

15. The network device according to claim 14, wherein the processor is further configured to:
send, by using the second transmitter to a radio access network device that provides a service to the second terminal, an assignment message used to set up a radio bearer of the voice service of the low voice quality codec scheme.

16. The network device according to claim 9, wherein the high voice quality codec scheme comprises an adaptive multi-rate narrowband codec (AMR-NB), an adaptive multi-rate wideband codec (AMR-WB), an enhanced voice services narrowband codec (EVS-NB), an enhanced voice services wideband codec (EVS-WB), an enhanced voice services super wideband codec (EVS-SWB), and an enhanced voice services fullband codec (EVS-FB), wherein
when the high voice quality codec scheme is EVS-FB, the low voice quality codec scheme is EVS-SWB, EVS-WB, EVS-NB, AMR-WB, or AMR-NB;
when the high voice quality codec scheme comprises the EVS SWB, the low voice quality codec scheme comprises the EVS-WB, EVS-NB, AMR-WB, or AMR-NB;
when the high voice quality codec scheme comprises the EVS-WB, the low voice quality codec scheme comprises the EVS-NB, AMR-WB, or AMR-NB;
when the high voice quality codec scheme comprises the EVS-NB, the low voice quality codec scheme comprises the AMR-WB or AMR-NB; and
when the high voice quality codec scheme comprises the AMR-WB, the low voice quality codec scheme comprises the AMR-NB.

* * * * *